(12) United States Patent
Hamilton et al.

(10) Patent No.: US 6,254,542 B1
(45) Date of Patent: *Jul. 3, 2001

(54) ULTRASONIC VISUALIZATION METHOD AND APPARATUS

(75) Inventors: Robin Hamilton, Fort William; Patrick Joseph Ryan, Thames Ditton; Derek Kelly, Borehamwood; Robert Julian Dickinson, London; Garvin David Wills, Southall, all of (GB)

(73) Assignee: Intravascular Research Limited, Isleworth (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/353,922

(22) Filed: Jul. 15, 1999

Related U.S. Application Data

(63) Continuation-in-part of application No. 08/773,411, filed on Dec. 27, 1996, now Pat. No. 5,935,072, which is a continuation of application No. 08/503,234, filed on Jul. 17, 1995, now Pat. No. 5,590,659.

(51) Int. Cl.[7] .................................................. A61B 8/00
(52) U.S. Cl. ............................................................. 600/447
(58) Field of Search ................................... 600/443, 447, 600/440; 367/7, 11, 138; 73/625, 626

(56) References Cited

U.S. PATENT DOCUMENTS

| | | |
|---|---|---|
| 3,548,642 | 12/1970 | Flaherty et al. . |
| 4,161,122 | 7/1979 | Buchner . |
| 4,209,853 | 6/1980 | Hyatt . |

(List continued on next page.)

FOREIGN PATENT DOCUMENTS

| | | |
|---|---|---|
| 3327525 | 4/1985 | (DE) . |
| 0017383 | 10/1980 | (EP) . |
| 0181677 | 5/1986 | (EP) . |

(List continued on next page.)

OTHER PUBLICATIONS

B.M. Shapo et al, "Efficient Synthetic Aperture–Based Imaging from a Circular Array: Experimental Results on a Catheter Probe", *1993 IEEE Ultrasonics Symposium*, pp. 1099–1102.

Complaint filed by Endosonics, Inc. and attachments, against IRL, on Aug. 28, 1997 in the Superior Court of the State of California for the County of Sacremento.

Complaint and attachments filed Sep. 19, 1997 in the U.S. District Court for the District of Delaware by IRL against Endosonics.

(List continued on next page.)

*Primary Examiner*—Marvin M. Lateef
*Assistant Examiner*—Ali M. Imam
(74) *Attorney, Agent, or Firm*—Richard M. Goldberg

(57) ABSTRACT

An ultrasound system includes a transducer array having a plurality of transducer elements for transmitting ultrasound pulses and for receiving-echo pulses in response thereto, a circuit for energizing each transducer element, or batches of elements of the array, in turn, to generate an ultrasound pulse, and for receiving echo signals from at least two transducer elements resulting from transmission of an ultrasound pulse from another transducer element so that data used to create an image of the echo signals comes from the two transducer elements, a control device for controlling the order in which the transducers are energized and the order in which the transducers receive an echo pulse so as to carry out the energization and reception sequentially, a circuit for acquiring sequentially the data in analog form for a whole aperture, for acquiring sequentially the data for successive apertures and for processing the data for beam-formation for each aperture in correspondence with an analog echo pulse received by each transducer such that appropriate data sets once acquired are used for beam-formation of more than one aperture, the circuit for acquiring and processing including a high speed memory, a circuit for loading filter coefficients into the high speed memory, and a circuit for varying the values of the filter coefficients.

3 Claims, 19 Drawing Sheets

U.S. PATENT DOCUMENTS

| | | |
|---|---|---|
| 4,215,584 | 8/1980 | Kuroda et al. . |
| 4,254,662 | 3/1981 | Kuroda et al. . |
| 4,325,257 | 4/1982 | Kino et al. . |
| 4,442,715 | 4/1984 | Brisken et al. . |
| 4,459,853 | 7/1984 | Miwa et al. . |
| 4,653,000 | 3/1987 | Matsumoto . |
| 4,733,552 | 3/1988 | Saugeon . |
| 4,751,846 * | 6/1988 | Dousse .................................. 73/602 |
| 4,787,392 | 11/1988 | Saugeon . |
| 4,815,047 | 3/1989 | Hart . |
| 4,870,972 | 10/1989 | Maerfeld et al. . |
| 4,917,097 | 4/1990 | Proudian . |
| 5,014,711 | 5/1991 | Nagasaki . |
| 5,081,993 | 1/1992 | Kitney et al. . |
| 5,123,415 | 6/1992 | Daigle . |
| 5,186,177 | 2/1993 | O'Donnell et al. . |
| 5,203,335 | 4/1993 | Noujaim et al. . |
| 5,235,982 | 8/1993 | O'Donnell . |
| 5,257,629 | 11/1993 | Kitney et al. . |
| 5,269,309 | 12/1993 | Fort et al. . |
| 5,329,930 | 7/1994 | Thomas, III et al. . |
| 5,431,167 | 7/1995 | Savord . |
| 5,453,575 | 9/1995 | O'Donnell et al. . |
| 5,584,295 * | 12/1996 | Muller et al. ........................ 600/453 |
| 5,590,659 * | 1/1997 | Hamilton et al. .................... 600/447 |
| 5,788,635 * | 8/1998 | Wright et al. ........................ 600/437 |

FOREIGN PATENT DOCUMENTS

| | | |
|---|---|---|
| 0204000 | 12/1986 | (EP) . |
| 0293773 | 12/1988 | (EP) . |
| 2011074 | 7/1979 | (GB) . |
| 2027197 | 2/1980 | (GB) . |
| 1577659 | 10/1980 | (GB) . |
| 2048478 | 12/1980 | (GB) . |
| 2053476 | 2/1981 | (GB) . |
| 2072847 | 10/1981 | (GB) . |
| 2208138 | 3/1989 | (GB) . |
| 2212267 | 7/1989 | (GB) . |
| 2246632 | 2/1992 | (GB) . |
| 2258364 | 2/1993 | (GB) . |
| 2268806 | 1/1994 | (GB) . |
| WO8500889 | 2/1985 | (WO) . |
| WO8503354 | 8/1985 | (WO) . |
| WO8904142 | 5/1989 | (WO) . |
| WO9014601 | 11/1990 | (WO) . |

OTHER PUBLICATIONS

M. O'Donnell et al, "Phase–Aberration Correction Using Signals from Point Reflectors and Diffuse Scatterers: Measurements", *IEEE Transactions on Ultrasonics, Ferroelectrics, and Frequency Control*, vol. 35, No. 6, pp. 768–774, Nov. 1988.

S.W. Flax et al, "Phase–Aberration Correction Using Signals From Point Reflectors and Diffuse Scatterers: Basic Principles", *IEEE Transactions on Ultrasonics, Ferroelectrics, and Frequency Control*, vol. 35, No. 6, pp. 758–767, Nov., 1988.

Stephen J. Norton, "Reconstruction of a Reflectivity Field From Line Integrals Over Circular Paths", *J. Acoust. Soc. Am.*, vol. 67, No. 3, pp. 853–863, Mar., 1980.

Stephen J. Norton, "Annular Array Imaging with Full–Aperture Resolution", *J. Acoust. Soc. Am.*, vol. 92, No. 6, Dec., 1992, pp. 3202–3206.

Brochure of Endosonics—The Cathscanner Intracoronary Imaging System, 1992.

* cited by examiner

SAFT : Classical  Catheter Size : 2.9 F
Frequency : 30.0 MHz
Number of Elements : 64

Kerf Width : 10.0 um
Transmit Channels : 1
Receive Channels : 1
Aperture Width :   7

Lateral Displacement in mm 6 dB Beam Width: 0.25mm     20 dB Beam Width: 2.98mm

SAFT : Multiple Element
       Catheter Size : 2.9 F
Frequency : 30.0 MHz
Number of Elements : 64

Kerf Width : 10.0 um
Transmit Channels : 3
Receive Channels : 3
Aperture Width :    3

Lateral Displacement in mm 6 dB Beam Width: 0.52mm     20 dB Beam Width: 1.89mm

SAFT : Cross Product
Catheter Size : 2.9 F
Frequency : 30.0 MHz
Number of Elements : 64

Kerf Width : 10.0 um
Transmit Channels : 1
Receive Channels : 1
Aperture Width :    7

Lateral Displacement in mm 6 dB Beam Width: 0.34mm          20 dB Beam Width: 0.58mm SAFT : Cross Product
 Catheter Size : 2.9 F
Frequency : 30.0 MHz
Number of Elements : 64

Kerf Width : 10.0 um
Transmit Channels : 1
Receive Channels : 1
Aperture Width :   7

Lateral Displacement in mm 6 dB Beam Width: 0.33mm     20 dB Beam Width: 0.53mm

SAFT : Cross Product
      Catheter Size : 2.9 F
Frequency : 30.0 MHz
Number of Elements : 64

Kerf Width : 10.0 um
Transmit Channels : 1
Receive Channels : 1
Aperture Width : 7

Lateral Displacement in mm 6 dB Beam Width: 0.30mm    20 dB Beam Width: 0.89mm

SAFT : Cross Product
　　　Catheter Size : 2.9 F
Frequency : 30.0 MHz
Number of Elements : 64

Kerf Width : 10.0 um
Transmit Channels : 1
Receive Channels : 1
Aperture Width :　　7

Lateral Displacement in mm 6 dB Beam Width: 0.45mm　　　20 dB Beam Width: 0.89mm

Fig. 10A 4 elements :- all cross-products are possible

| | Transmit Channel | | | |
|---|---|---|---|---|
| | 0 | 1 | 2 | 3 |
| R 0 | x | x | x | x |
| e 1 | x | x | x | x |
| c 2 | x | x | x | x |
| e 3 | x | x | x | x |
| i | | | | |
| v | | | | |
| e | | | | | x - this combination is possible

Fig. 10B 5 elements :- 23 out of 25 cross-products are available

| | 0 | 1 | 2 | 3 | 4 |
|---|---|---|---|---|---|
| 0 | x | x | x | x | 0 |
| 1 | x | x | x | x | x |
| 2 | x | x | x | x | x |
| 3 | x | x | x | x | x |
| 4 | 0 | x | x | x | x |

Fig. 10C 6 elements :-

| | 0 | 1 | 2 | 3 | 4 | 5 |
|---|---|---|---|---|---|---|
| 0 | x | x | x | x | 0 | # |
| 1 | x | x | x | x | x | 0 |
| 2 | x | x | x | x | x | x |
| 3 | x | x | x | x | x | x |
| 4 | 0 | x | x | x | x | x |
| 5 | # | 0 | x | x | x | x |

Fig. 10D 7 elements :-

| | 0 | 1 | 2 | 3 | 4 | 5 | 6 |
|---|---|---|---|---|---|---|---|
| 0 | x | x | x | x | 0 | # | # |
| 1 | x | x | x | x | x | 0 | # |
| 2 | x | x | x | x | x | x | 0 |
| 3 | x | x | x | x | x | x | x |
| 4 | 0 | x | x | x | x | x | x |
| 5 | # | 0 | x | x | x | x | x |
| 6 | # | # | 0 | x | x | x | x | x - these combinations are possible
0 - these combinations are NOT possible
- these combinations are possible by re-loading the shift register and may not be possible with a fast frame

ULTRASONIC VISUALIZATION METHOD AND APPARATUS

REFERENCE TO RELATED APPLICATION

The present application is a continuation-in-part of U.S. patent application Ser. No. 08/773,411, filed Dec. 27, 1996 by Robin Hamilton et al for ULTRASONIC VISUALISATION METHOD AND APPARATUS now U.S. Pat. No. 5,935,072, which in turn, is a continuation of U.S. patent application Ser. No. 08/503,234, filed Jul. 17, 1995 by Robin Hamilton et al for ULTRASONIC VISUALISATION METHOD AND APPARATUS, now U.S. Pat. No. 5,590,659.

BACKGROUND OF THE INVENTION

The present invention relates to an ultrasonic visualization method and apparatus and is particularly useful in obtaining intravascular ultrasonic images. There is disclosed in our U.K. Patent Nos. 2,208,138; 2,212,267 and 2,246,632, systems for producing intravascular ultrasonic images and the present invention is concerned with providing various improvements to those systems.

Intravascular ultrasound is gaining acceptance as a clinical tool in the diagnosis and treatment of coronary artery disease. The technical problem of forming an image from an ultrasound transducer mounted at the tip of a catheter having a diameter of typically 1 mm has led to two distinct approaches. First there are catheters with a single rotating transducer. These are capable of producing high quality images but suffer from image distortion due to vibration of the tip and non-uniform rotation of the transducer, problems caused by the long, flexible rotating drive shaft. The other approach is to have a multi-element transducer. As there are no moving-parts this design does not suffer from the image distortions of the rotational approach, but has hitherto suffered from poor image quality due to an inability to perform the beam-forming satisfactorily. This invention is concerned with multi-element transducers, and concerns a new approach to the beam-forming problem, which will give high quality images.

Using multi-element transducers to form high-quality ultrasound images is well understood in external ultrasound. The usual method is to transmit on a group of elements, with the excitation signal to each element having an appropriate time delay so that the transmitted acoustic field is focused at a particular point in the field. After this excitation, the signal received on each element of the subgroup is appropriately delayed prior to summation to focus the receive field response a specific range from the transducer. The set of delays can be altered during the echo period so that the receive focus is appropriate for the instantaneous echo-range, a technique called dynamic focus.

This approach can generate images with narrow point spread functions and low side-lobe levels. However the hardware architectures it demands are not possible within the millimeter size constraints of catheter based ultrasound. The need to separately address several elements at once means either the provision of a separate cable to each element, or significant beam-forming circuitry incorporating the delays closely connected to the elements positioned at the transducer head. Neither of these approaches can be provided in the space permitted.

The limited space available does permit a limited number of signal cables and a simple multiplexer arrangement. Such an architecture permits the use of simple synthetic aperture techniques such as those disclosed in U.S. Pat. No. 4,917, 097 (Proudian/Endosonics). In this technique transmit-receive signals from individual elements are obtained sequentially, stored in memory and then post-processed by a synthetic aperture algorithm which includes the time delays required to focus the data. This technique has the limitation that the dynamic range, defined as the signal ratio between the signal peak and the side-lobes outside the main beam, is too low for high-quality grey-scale imaging. (see FIG. 2)

A further disadvantage of this technique is that for reduction of side lobes the pitch of the elements has to approach one-half wavelength which is very expensive to achieve. At a frequency of 30 MHz, this means the elements have to be separated by twenty three microns, and one hundred and twenty eight are needed for a 1 mm diameter catheter. The micro-engineering of such a large number of elements and the associated interconnection problems would make such a design expensive. This approach has the additional disadvantages that the acoustic response of such small elements has low sensitivity, and the electrical impedance of the elements is high, creating difficulties in efficient electrical matching to the transmit and receive circuitry.

To overcome this O'Donnell has described an alternative synthetic aperture approach, in which groups of adjacent elements are connected together to create a group-element. (See O'Donnell and Thomas, L. J., "Efficient Synthetic Aperture Imaging from a Circular Aperture with possible application to Catheter-Based Imaging" IEEE Trans Ultrasonic, Vol. 39, No. 3, pages 366–380, 1992). Electronic rotation is performed by successively connecting in a new element on one end of the array, and disconnecting one on the other end. This has the advantage that the group-element has a lower electrical impedance and has greater acoustic sensitivity than a single element but it still requires a large number of elements to give good quality beam-profiles.

To improve the beam-forming capability of these synthetic aperture techniques O'Donnell has described the use of an optimal filtering technique. This uses an optimization technique to produce a set of filter coefficients which produce a beam profile with lower side-lobe levels than the standard synthetic aperture coefficients. The application of this technique is described mainly in relation to the group-element data acquisition but it can also be applied to single element synthetic aperture. In particular it can be used to correct for the poor beam profile obtained by catheters with lower numbers of elements, enabling these to produce higher dynamic range images. However, the use of group elements, or lower number of elements than optimum gives a beam profile with very high side lobes as shown in FIG. 2 and FIG. 3. The application of the optimization technique will improve the side-lobe levels, but there is a trade-off with main lobe width and noise immunity which this method must contend with. It is better to use a technique which produces better beam profiles to start with.

The ultrasonic visualization method and apparatus to which the present invention applies has a number of medical applications. These include those in which a so-called stent has been inserted into a patient's artery in order to restore or substantially restore the lumen of the artery to its original cross-section. Stents are well known devices for this purpose and once inserted into a patient's artery would remain there. There is, however, a risk that the wall of the artery at the location of the stent (typically a diseased area of that wall) will reform over and around the stent itself to again reduce the cross-section of the lumen of the artery. This phenomenon is known as "restenosis."

In using an ultrasound system of the kind to which the present invention relates, there is a problem in distinguishing echo signals from the stent itself and those from the surrounding tissue. More particularly, because the echo signals reflected from the stent are many orders of magnitude greater than those reflected from the surrounding tissue, the latter are swamped by the former with a result that the effective visualization of the surrounding tissue is not achieved.

As part of the design of the system according to the present invention filter coefficients must be calculated which have sufficiently low side-lobes to form accurate images from the cross-product signals. Using a fixed set of filter coefficients, the problematic situation shown in FIG. 18 is encountered. The strong reflector (e.g. a stent) is in the side-lobes of the current aperture and hence is suppressed relative to the signals of equal strength in the main lobe. However, when one is imaging tissue at the focal point, the spatial filtering may still be insufficient to adequately suppress the side-lobe signals. Hence the array gives an output from the side-lobe signal and correspondingly gives an image on the screen at the focal point. The clinician then has no means of knowing whether this signal is a side-lobe signal from the stent or a true tissue signal at the focal point.

As discussed earlier, although O'Donnell and Thomas have described an approach which reduces the size of the side-lobes, this may still not overcome the problem discussed immediately above. This is because either the side-lobes may still not be low enough or if they are, then there will be a wider main lobe, as discussed earlier. The latter will result in images of the stent which are "smeared" thus making it difficult to detect tissue which is close to the stent.

SUMMARY OF THE INVENTION

The present invention is concerned with overcoming the problems of these prior art arrangements to enable a high quality ultrasound image to be produced whilst at the same time controlling the cost of the system.

According to the present invention in an ultrasound system employing a transducer array, transmit ultrasound pulses are generated by at least one transducer element of the array and the resultant echo pulse is received by at least one other transducer of the array.

According to another aspect of the present invention, in an ultrasound system employing a transducer array, the transmission and receipt of transmit ultrasound pulses and echo ultrasound pulses is arranged so that for each transmit ultrasound pulse emanating from a single transducer element the resultant echo is received by at least one other element of the array so that the plurality of echo signals from the at least two other transducer elements can be processed to give cross-product terms.

The term "cross product" means that the ultrasound image is formed on the basis of an echo received by at least one transducer element other than the transmitting transducer element.

The earlier discussed prior art techniques all use the same element or group element to transmit and receive. Better beam profiles are obtained if so-called cross-products are obtained. Thus according to the present invention an ultrasonic A-scan is attained by using different elements to transmit and receive. For an aperture of n elements there will be $n^2$ such combinations. If these are combined with a standard synthetic aperture algorithm the beam profile so produced is identical to that of traditional dynamic focus ultrasound, as for example disclosed in Hewlett-Packard Journal, Vol. 84, No. 12, at the transmit focus, but with the data acquired sequentially in $n^2$ firings rather than generated and received in one firing.

The present invention is concerned with a system for imaging using such cross-products. The advantage of using these cross-products is that the beam profile will have substantially lower side-lobes than that obtained from either the known single element synthetic aperture or the known group element synthetic aperture approach disclosed earlier. The latter two known techniques can be improved further by using an optimal filtering technique.

The present invention is also concerned with an optimization technique for improving the beam profile of an ultrasound field produced by the cross-product method. This optimization technique requires a more complex mathematical approach than that described by O'Donnell in the above paper.

According to the present invention the problem discussed above in relation to strong echo signals from the reflector, such as a stent, drowning those emanating from the surrounding tissue is overcome or reduced by employing adaptive signal processing whereby the filtering coefficients supplied to the echo signals are varied or tuned in accordance with the cross-product data.

The adaptive signal processor in effect recognizes that the phase-shift across the aperture for signals from the side-lobe reflector is not the correct phase for the current focal point. The coefficients are then tuned to steer a side-lobe null in the direction of the side-lobe reflector. Much greater attenuation is then provided to signals from this direction compared to relying on a fixed, low side-lobe beam pattern. This extra attenuation allows improved detection of the true signals from the tissue at the focal point.

Adaptive signal processing is a known technique and further information concerning it can be found in "Adaptive Filter Theory" 2nd Edition, Prentice Hall Inc. 1991 by S. Haykin.

BRIEF DESCRIPTION OF THE DRAWINGS

How the invention may be carried out will now be described by way of example only and with reference to the accompanying drawings in which:

FIGS. 10A–10D illustrate the cross-products available from the multiplexer architecture shown in FIG. 9 for various aperture sizes;

DESCRIPTION OF THE PREFERRED EMBODIMENTS

FIG. 1

Figure 1:
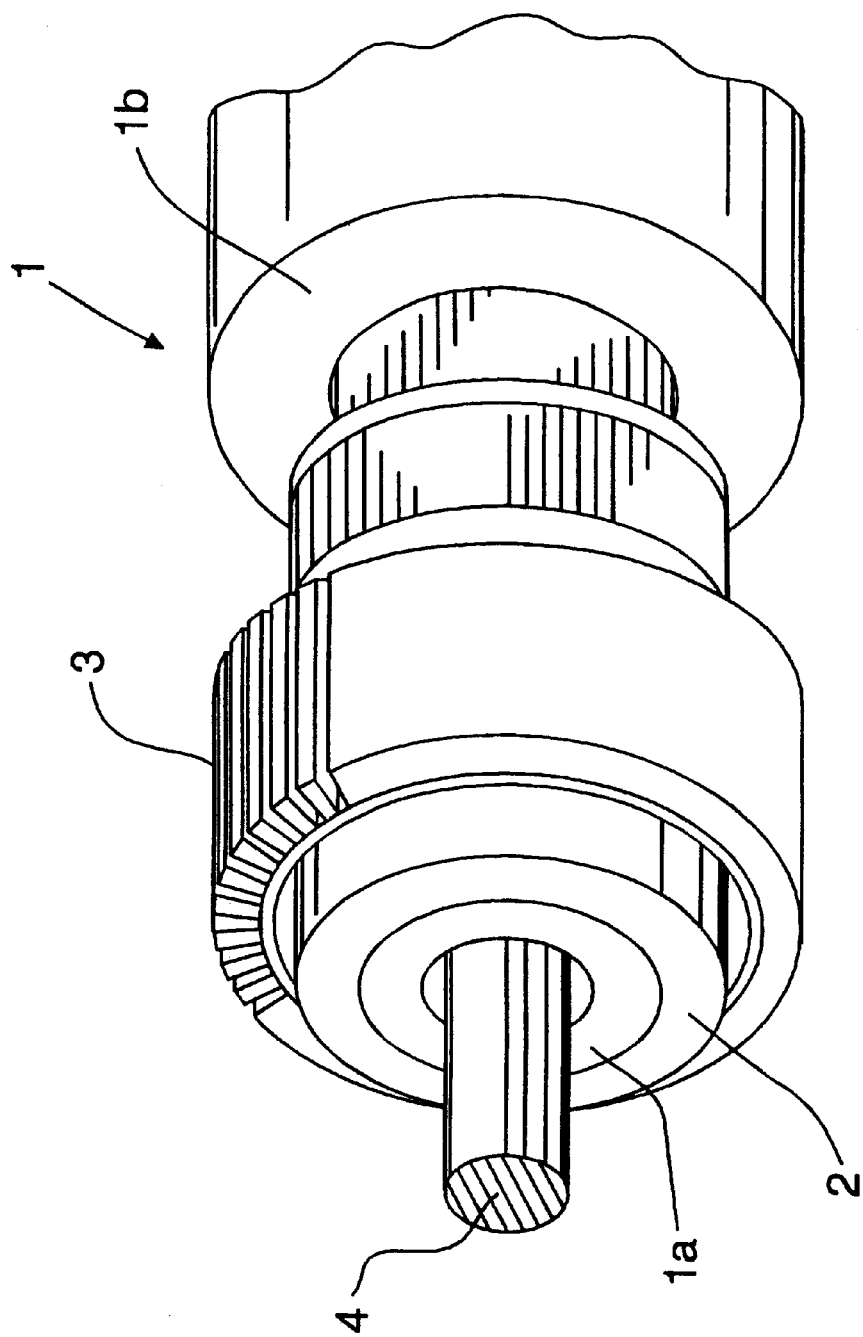
FIG. 1 is a diagrammatic perspective view of an ultrasonic transducer array of the kind to which the present invention may be applied.

This is the same as FIG. 2 of our copending U.K. Patent Application No. 9116478 and shows the distal end of a catheter.

A catheter 1 has an inner tube 1a and an outer tube 1b both of which are made from a suitable molded plastics material such as nylon.

An electrically conducting support tube 2 is carried on the inner tube 1a and is bonded thereto.

A ceramic piezo-electric transducer array 3 is mounted on the support tube 2. The usual guide wire 4 passes through the inner tube 1a. A more detailed description of this construction of catheter and ultrasonic transducer array can be found in our copending U.K. Patent Application No. 9116478.

Figure 2A:
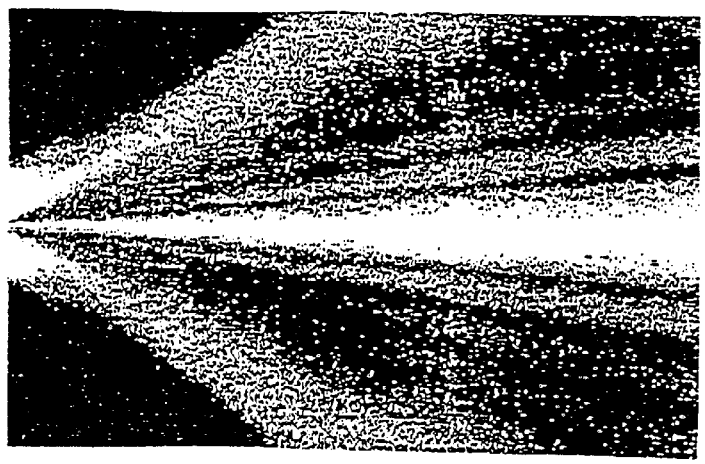
FIG. 2A is a gray-tone computer generated plot produced by a high quality printer, illustrating the performance characteristics of the prior art method of a transducer operation as disclosed in U.S. Pat. No. 4,917,097 (Proudian/Endosonics)
Figure 2B:
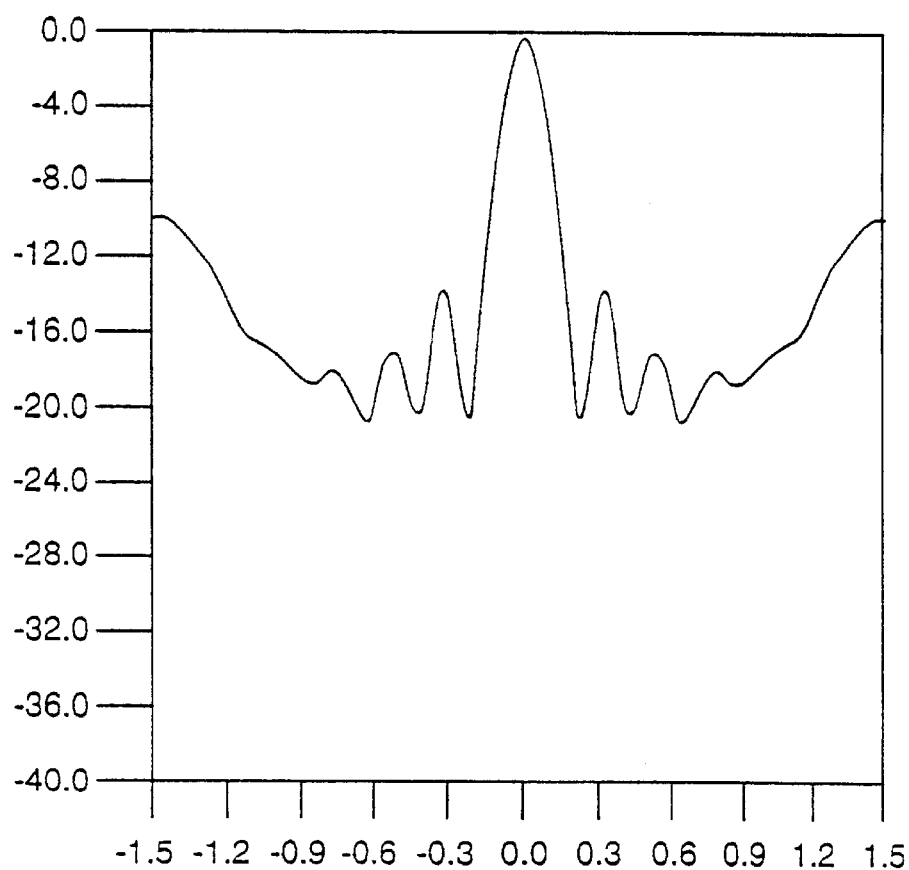
FIG. 2B is a graph corresponding to the plot of FIG. 2A.

FIGS. 2A and 2B

These Figures illustrate the performance characteristics of the prior art arrangement disclosed in U.S. Pat. No. 4,917,097 (Proudian/Endosonics). As can be seen from these Figures the value/height of the side-lobes is large in comparison with the central beam. This characteristic has the effect of limiting the dynamic range and grayscale of this prior art arrangement.

Figure 3A:
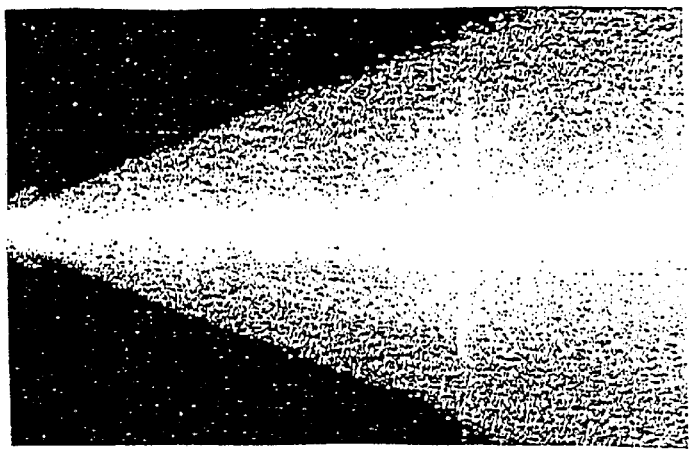
FIG. 3A is a gray-tone computer generated plot produced by a high quality printer and which illustrates the performance characteristics of the prior art method of transducer operation as disclosed by O'Donnell in the above referred to paper.
Figure 3B:
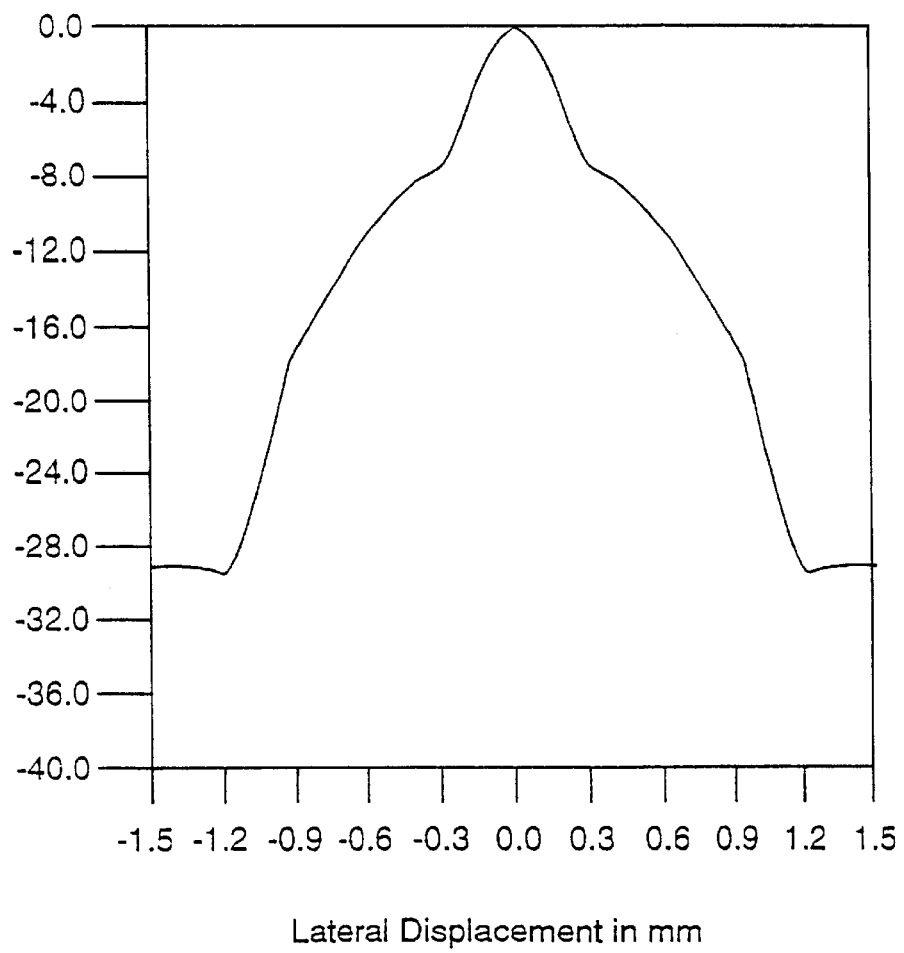
FIG. 3B is a graph corresponding to the plot of FIG. 3A.

FIGS. 3A and 3B

These Figures illustrate the performance characteristics of the prior art arrangement in the O'Donnell paper referred to earlier.

One of the objectives of this prior art arrangement is to reduce the height of the side-lobes in relation to the base of the central beam. Although this has been achieved, thus improving the potential dynamic range, this has been done at the expense of the characteristics of the beam profile as a whole and will worsen the noise immunity of the system.

FIGS. 4A to 6B

These Figures illustrate the performance characteristics of the embodiments of the present invention and are to be compared with FIGS. 2A, 2B and 3A, 3B in order to appreciate the improvements and advantages provided by the present invention.

Figure 4A:
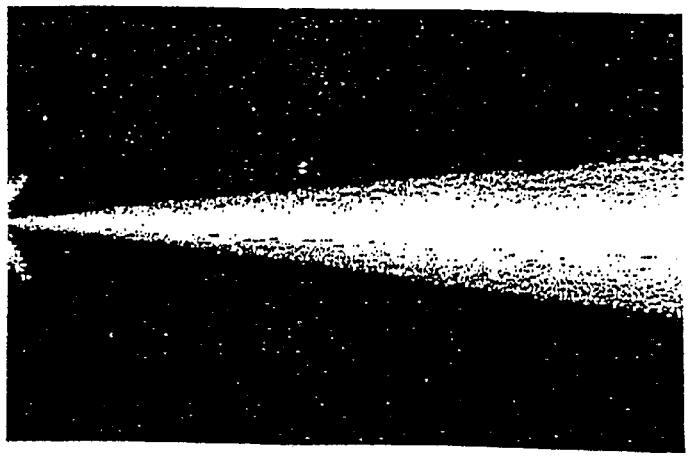
FIG. 4A is a gray-tone computer generated plot produced by a high quality printer, illustrating the performance characteristics of one embodiment of the present invention.
Figure 4B:
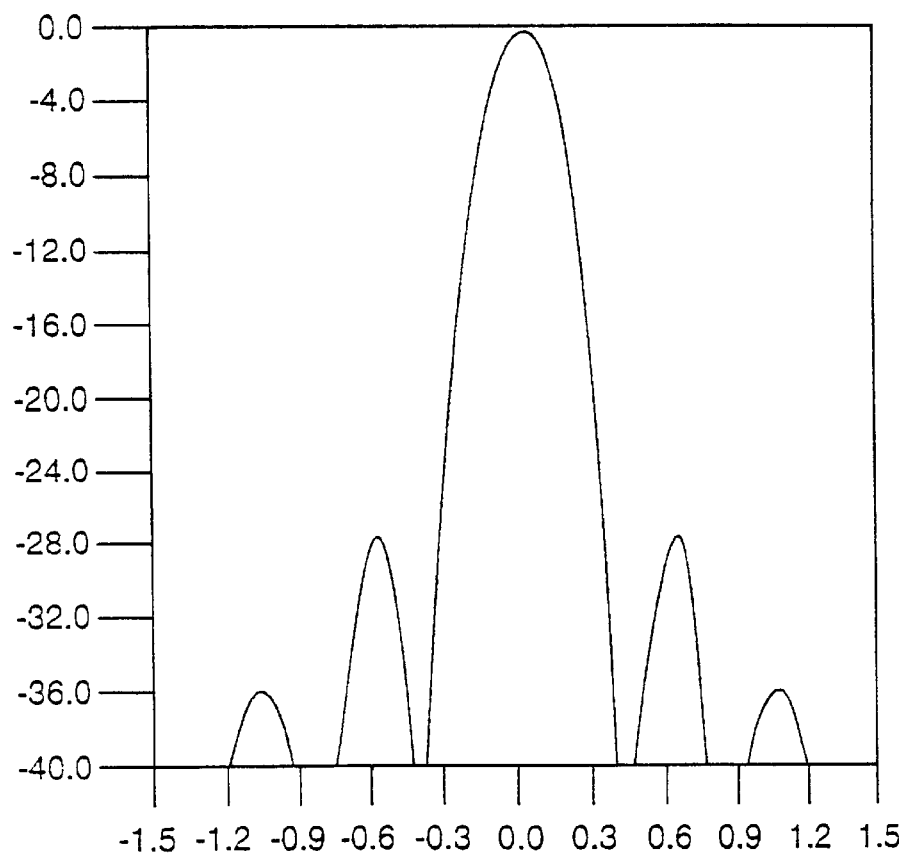
FIG. 4B is a gray-tone computer generated plot produced by a high quality printer.

FIGS. 4A and 4B illustrate the performance characteristics that would be obtained if a full set of cross-products could be used. The problem involved in doing this will be explained in relation to FIG. 8.

Figure 5A:
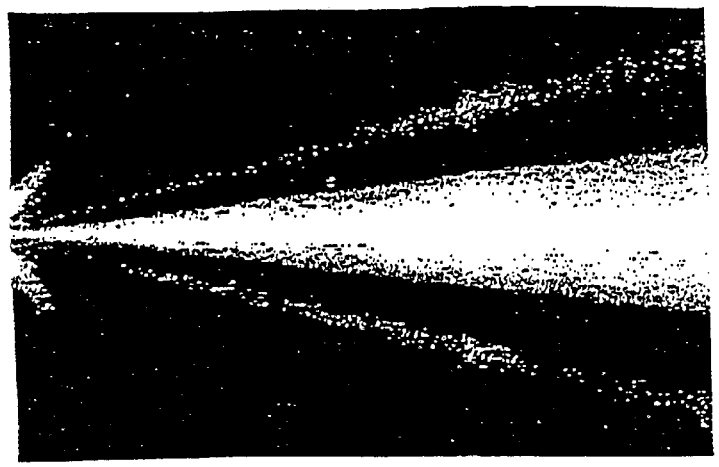
FIG. 5A is a gray-tone computer generated plot produced by a high quality printer, illustrating the performance characteristics of a second embodiment of the present invention.
Figure 5B:
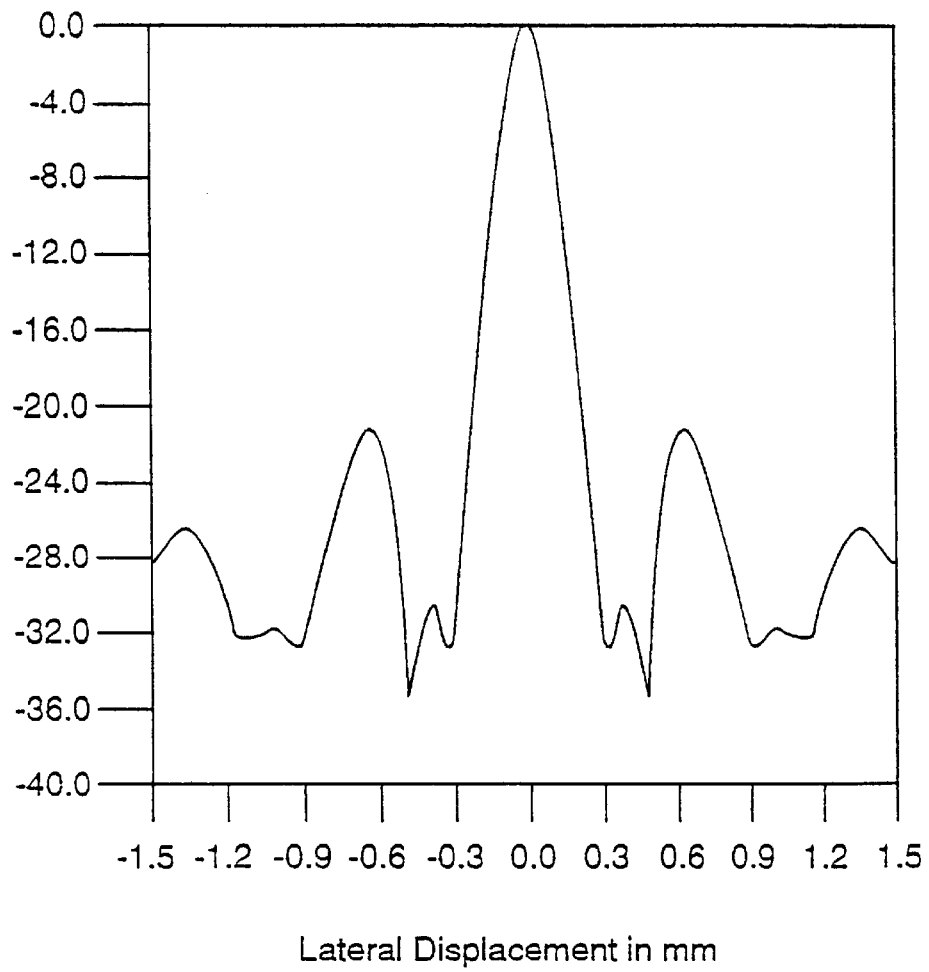
FIG. 5B is a graph corresponding to the plot of FIG. 5A.

FIGS. 5A and 5B illustrate the performance characteristics that would be obtained in using a first limited number of cross-products. More specifically the missing A-scan lines are: 0-4, 0-5, 0-6, 1-5, 1-6, 2-6, 4-0, 5-0, 6-0, 5-1, 6-1 and 6-2.

Figure 6A:
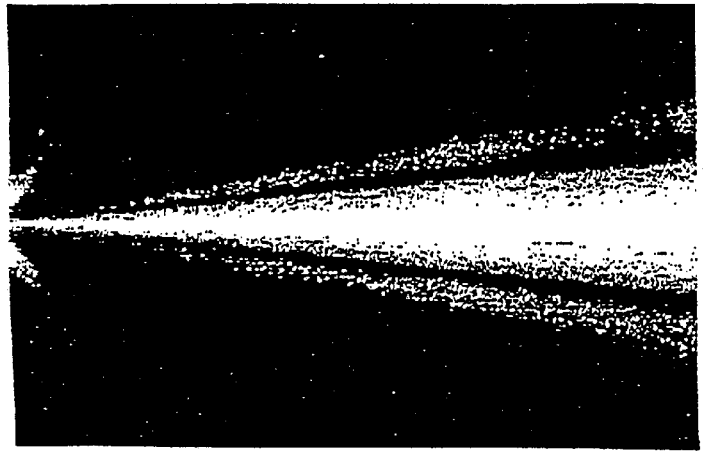
FIG. 6A is a gray-tone computer generated plot produced by a high quality printer, illustrating the performance characteristics of a third embodiment of the present invention.
Figure 6B:
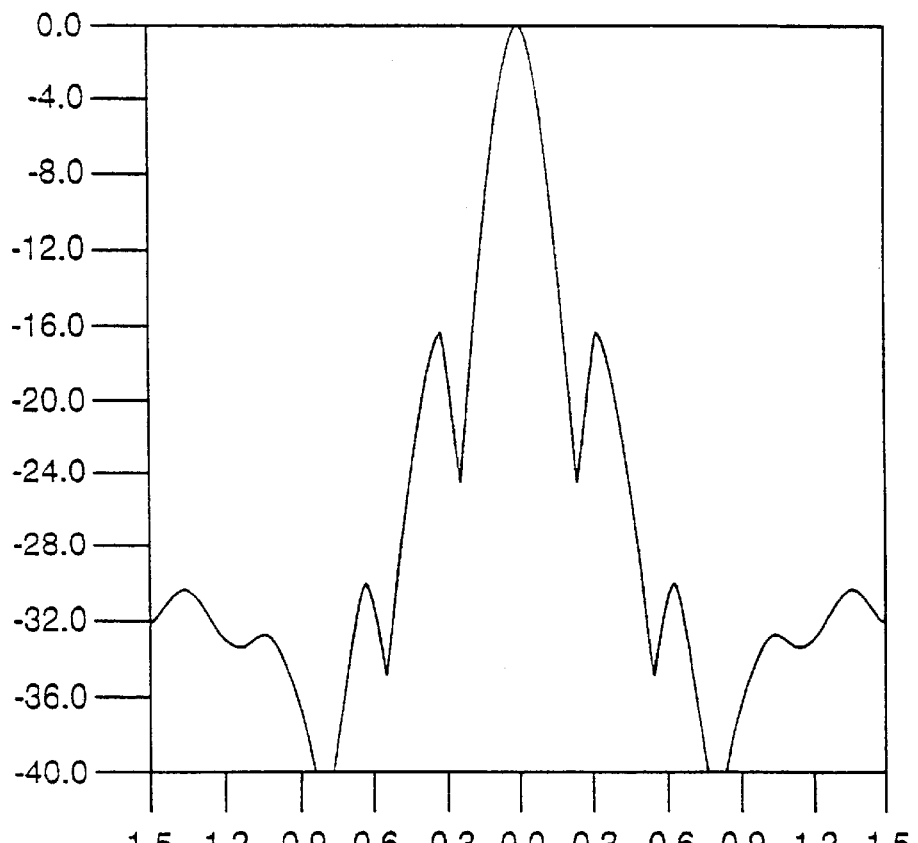
FIG. 6B is a graph corresponding to the plot of FIG. 6A.

FIGS. 6A and 6B illustrate the performance characteristics that would be obtained using a second limited number of cross-products. More specifically the missing A-scan lines are: 0-4, 0-5, 1-5, 2-6, 4-0, 5-1 and 6-2.

Figure 7A:
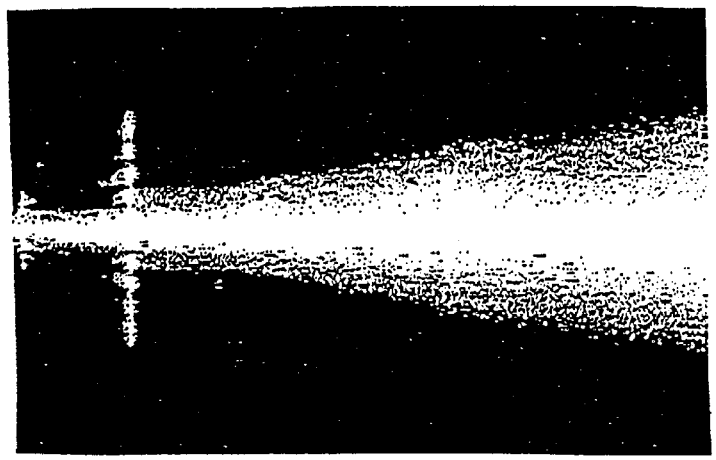
FIG. 7A is a gray-tone computer generated plot produced by a high quality printer, illustrating the performance characteristics of a fourth embodiment of the present invention.
Figure 7B:
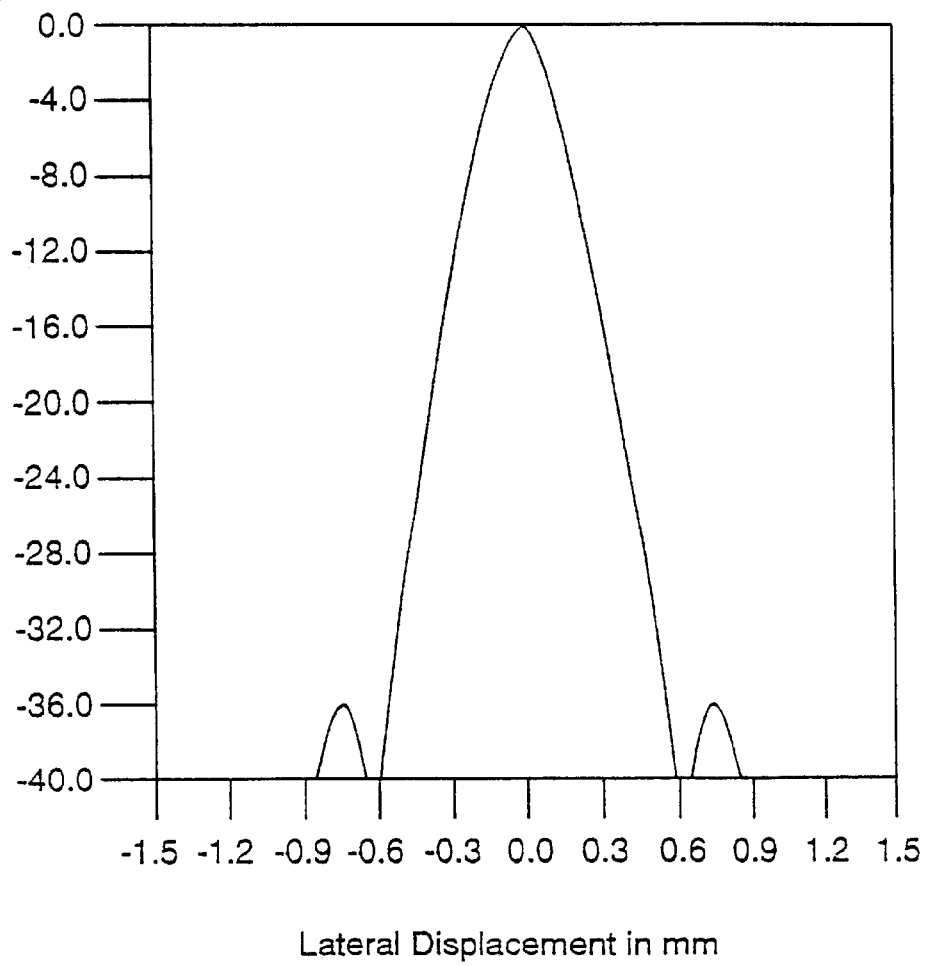
FIG. 7B is a graph corresponding to the plot of FIG. 7A.

FIGS. 7A and 7B illustrate the performance improvement that is obtainable by applying the optimization technique of the present invention.

FIG. 8

Figure 8:
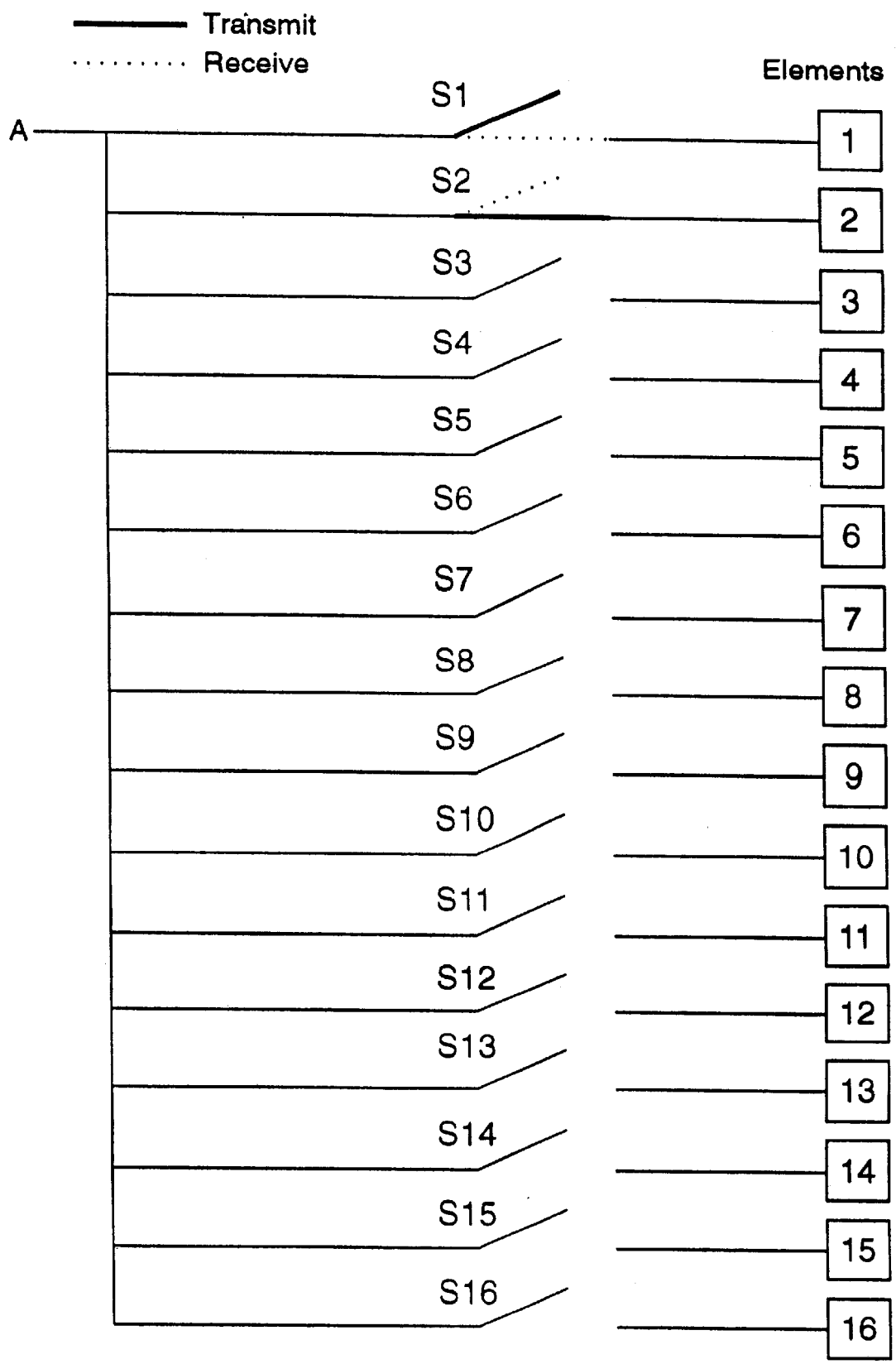
FIG. 8 represents diagrammatically the problem involved in switching the transducer elements in order to maintain the maximum number of cross-products.

To obtain a full set of cross-products with a multi-element tip mounted on a catheter would require a multiplexer architecture of the sort disclosed in FIG. 8. It can be seen that the position of at least one switch has to change between the transmit and receive parts of an acquisition with transmit and receive on different elements. Such a switch will have a finite switching time and generate a switching transient which will obscure signals from very close to the transmit pulse. This will create a dead-zone of 0.5–1 mm around the catheter within which no echoes will be detectable which is unacceptable in the intravascular situation, although it may be permissible in external ultrasound where it is not necessary to image the first few mm of skin.

FIG. 9

Figure 9:
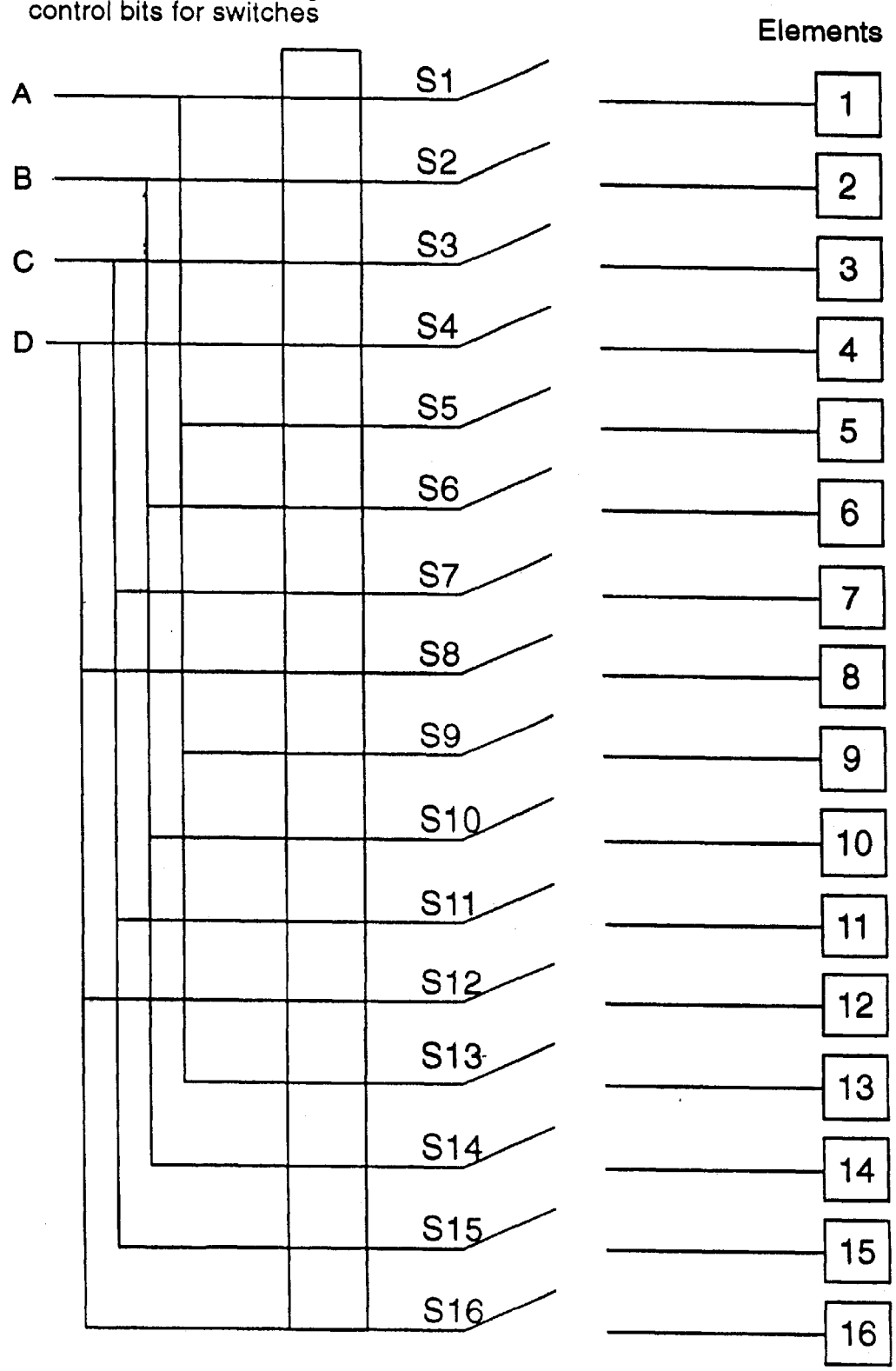
FIG. 9 is similar to FIG. 8 but illustrating the solution to the problem of FIG. 8 according to the present invention.

The multiplexer arrangement shown in FIG. 9 avoids having to switch elements between transmission and reception and uses a minimum number of switches. This arrangement has a number (in this case four) of signal lines. By closing switches S1 and S2, it is possible to transmit on element 1 via line A and receive on element 2 via line B. With this arrangement most cross-products are possible, with the exception of those that have different elements but the same signal line, such as 1-5, 2-6, 3-7, 4-8, 1-9, 1-13, 2-10, 2-14, 3-11, 3-15, 4-12, 4-16.

The most convenient method of controlling these switches is to have a shift register loaded with control bits. This enables the next switch in the sequence to be operated by clocking the shift register along one bit, and it is suitable for serial control lines rather than parallel addressing. For large apertures all the permissible cross-products cannot be obtained by clocking one bit pattern through the shift register. The shift register has to be cleared and a second pattern loaded. FIGS. 10A–10D show the cross-products available with one and two bit patterns, with four r.f. signal lines, for different apertures.

This limited cross-product data set gives a beam profile (see FIGS. 5A, 5B and 6A, 6B) that is not significantly inferior to that obtained by the full cross-product data-set (see FIGS. 4A and 4B), and is superior to the prior art single element or group element synthetic aperture approach.

The prior art single element or group element synthetic aperture is reconstructed with the following equation (1):

$$A_k(t) = \sum_{i=k-m}^{k+m} F_{i-m}(t) \cdot BB_i(t)$$

In this equation $BB_i$ is the baseband (complex) signal from the k'th element or element group, and $F_1$ is a complex filter coefficient. The aperture size is 2m+1, and F is only defined for 2m+1 values. This equation is then a series of range dependant one dimensional linear convolutions, often referred to as complex filtering. For a catheter with N elements, both single element and element group synthetic aperture technique produce N independent A-scans, and process these with suitable coefficients to obtain a set of N processed A-scans.

Figure 16:
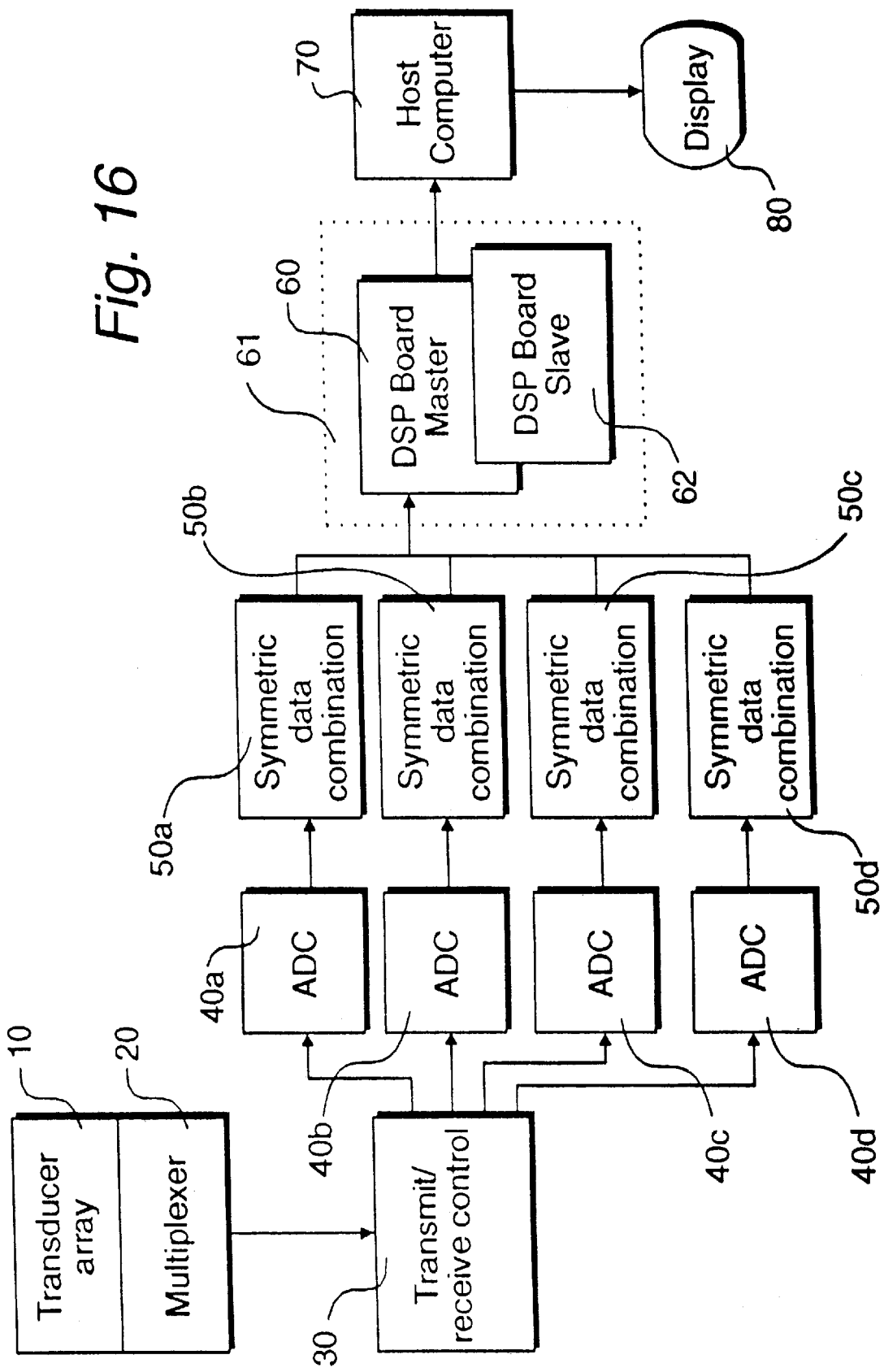
FIG. 16 shows a modification of the arrangement shown in FIG. 13.
Figure 17:
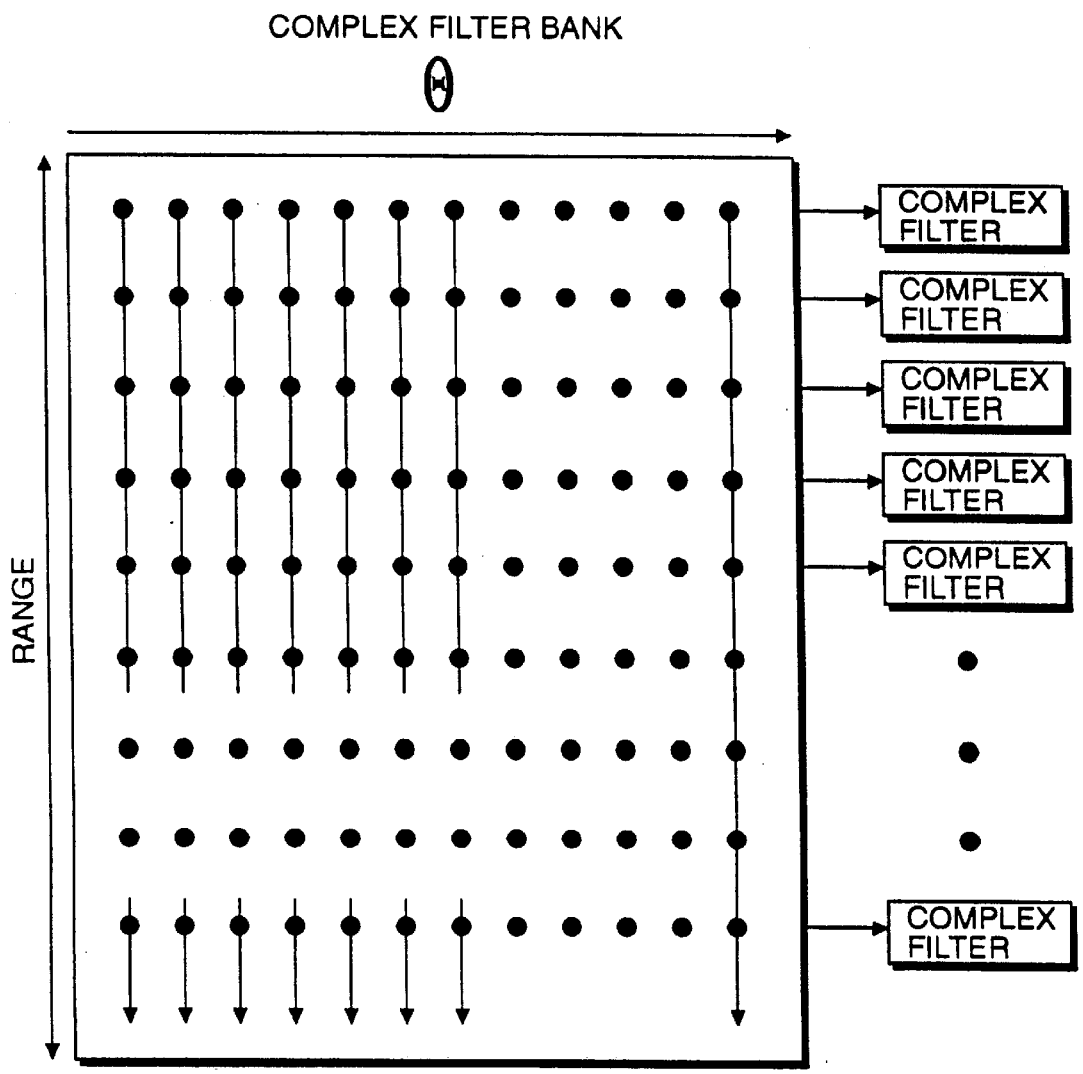
FIG. 17 illustrates so-called corner-turn architecture of the type disclosed in U.S. Pat. No. 5,186,177 (O'Donnell)

This can be implemented with a two-dimensional corner turn architecture as shown in FIG. 16.

In contrast to the prior art arrangement just described the situation when there are cross-products is very different and in this case the equation representing the reconstruction is as in the following equation (2):

$$D_n = \sum_{j=n-M}^{n+M} \sum_{k=n-M}^{n+M} B_{j,k} F_{j-n,k-n} \quad \text{for } n = -0 \ldots N$$

where:

$D_n$ is the output at scan line n.

$B_{j,k}$ is the received acoustic signal when transmitting on element j and receiving on element k.

$F_{j-n,k-n}$ is the complex filter coefficient applied to $B_{j,k}$ and 2m+1 is the aperture width and N is the total number of elements.

Note that $B_{-ij} = B_{N-ij}$.

So with an aperture of 2M+1, $(2M+1)^2$ lines of data and filter coefficients are used, so a corner-turn architecture is not possible.

Figure 11:
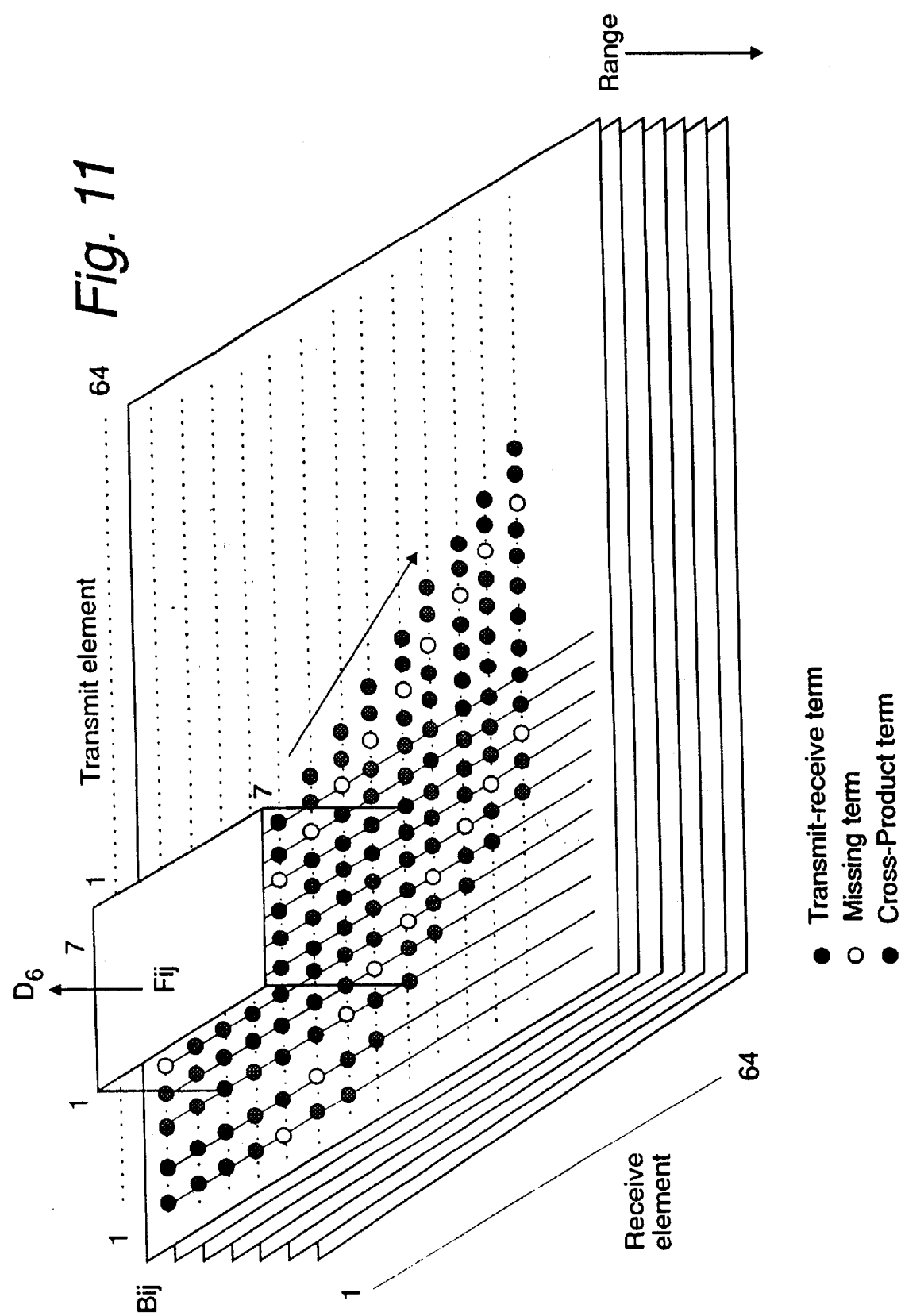
FIG. 11 is a diagrammatic perspective symbolic representation of the method of the present invention.

The data at a particular range can be represented by an N*N matrix, where N is the number of elements, and Bij represents the data transmitting on element i and receiving on j. As shown in FIG. 11 this matrix only has points (shown by solid dots) in a band about its leading diagonal, and there are also lines of forbidden points (shown by circles) that are not permissible with the multiplexer architecture shown in FIG. 9. The coefficients to produce a single point $D_n$ are represented by a (2m+1)×(2m+1) array, Fij. Each point $D_n$ is calculated by a matrix multiplication of Fij with appropriate points for Bij. The next point $D_{n+1}$ is calculated by moving the matrix F along the leading diagonal, and performing another matrix multiplication.

The complex filter coefficients F determine the lateral response, $D_n$. One form the coefficients F can take is given by the conventional synthetic aperture of the following equation (3):

$$F_{ij} = \frac{e^{ik(ri+rj)}}{(A(r_i)A(r_j))}$$

where $r_i, r_j$ are the distances from the field point r to the elements i,j respectively and $A(r_i)$ is the sensitivity at point r from element i.

If this reconstruction equation is applied to the full cross-product data set, then the resultant data set $D_n$ is identical to that produced with the conventional dynamic beam-forming method at the transmit focus. The only difference is that the data is acquired sequentially rather than in one acquisition, and the response is shown in FIGS. 4A and 4B.

If this reconstruction equation is applied unaltered to the limited cross-product data set, as produced by the hardware architecture described in FIG. 9, then the resultant $D_n$ will have inferior properties to that produced from the full cross-product data set (FIGS. 4A and 4B). There are many advantages in further limiting the cross-products to a smaller set that is obtained from one bit pattern of a shift register as described in FIGS. 10A–10D, as this permits a faster and simpler operation of the multiplexer, and the resultant field pattern is shown in FIGS. 6A and 6B.

It can be seen that the processed data represented by FIGS. 5A, 5B and 6A, 6B is still superior to that given by the prior art as demonstrated in FIGS. 2A, 2B and 3A, 3B.

The cross-products may in certain circumstances be limited further by now acquiring data where the same element is used for transmit and receive, represented by $B_{jk}$ in equation 2. Such data will be the most prone to acoustic ring-down and its exclusion from the data set used for the reconstruction will enable echoes closer to the transducer to be detected.

The reconstructed response $D_n$ can be improved further if the filter coefficients Fij are obtained not from the standard synthetic aperture algorithm of equation (3), but by an optimization process which minimizes the least square array between the reconstructed data set given by equation (2), and a desired acoustic response D'.

The filter coefficients F are given by the following equation:

$$F = (B^T A^T A B - \lambda I)^{-1} B^T A^T A D' \quad \text{(Equation 4)}$$

where

B is a matrix representing the cross-product data B

D' is the desired acoustic response

A is a vector representing an element weighting function

I is the identity matrix

λ is a stabilization constant

T is the matrix transpose operation

Figure 13:
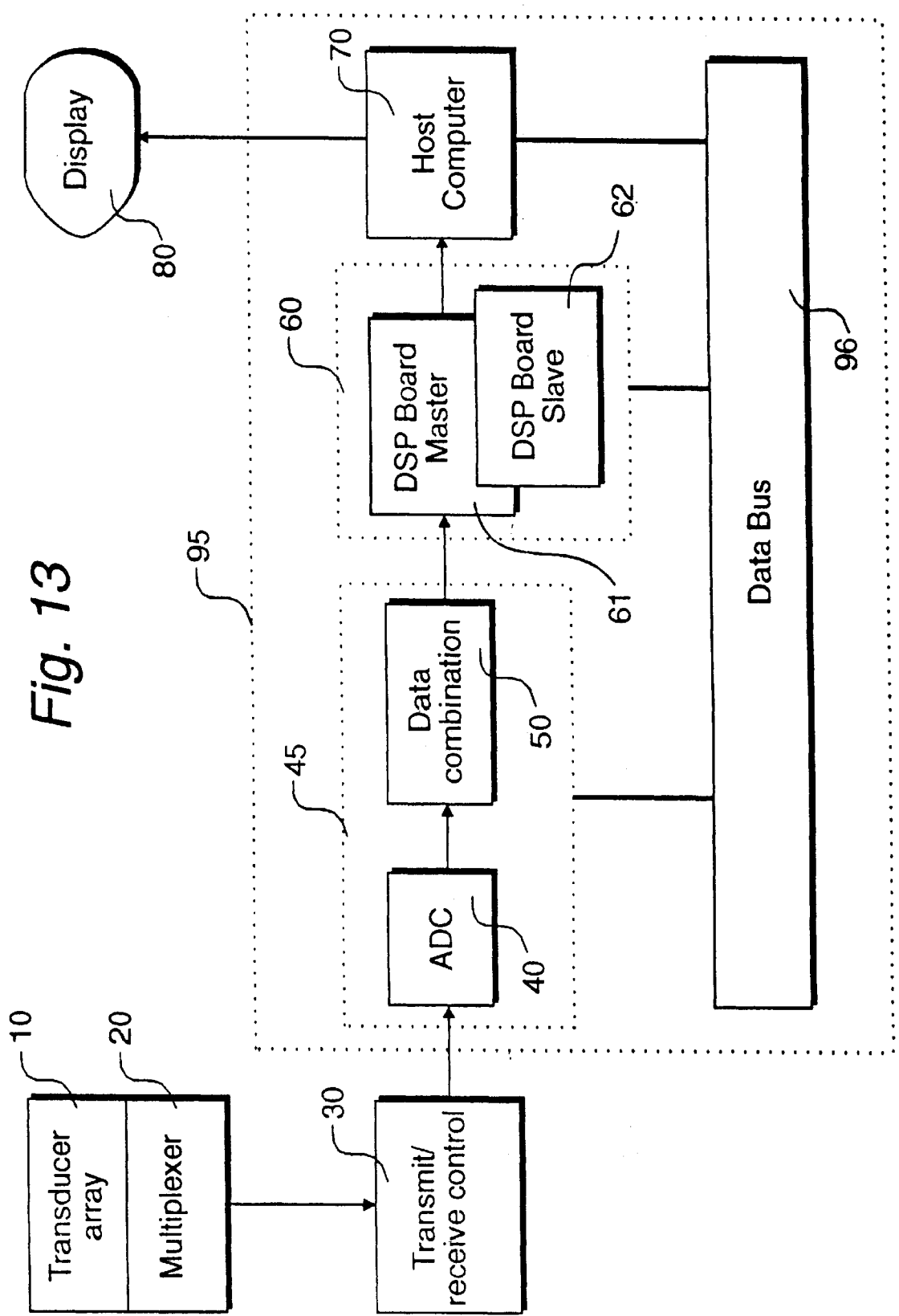
FIG. 13 is a block diagram of a system incorporating the present invention.
Figure 14:
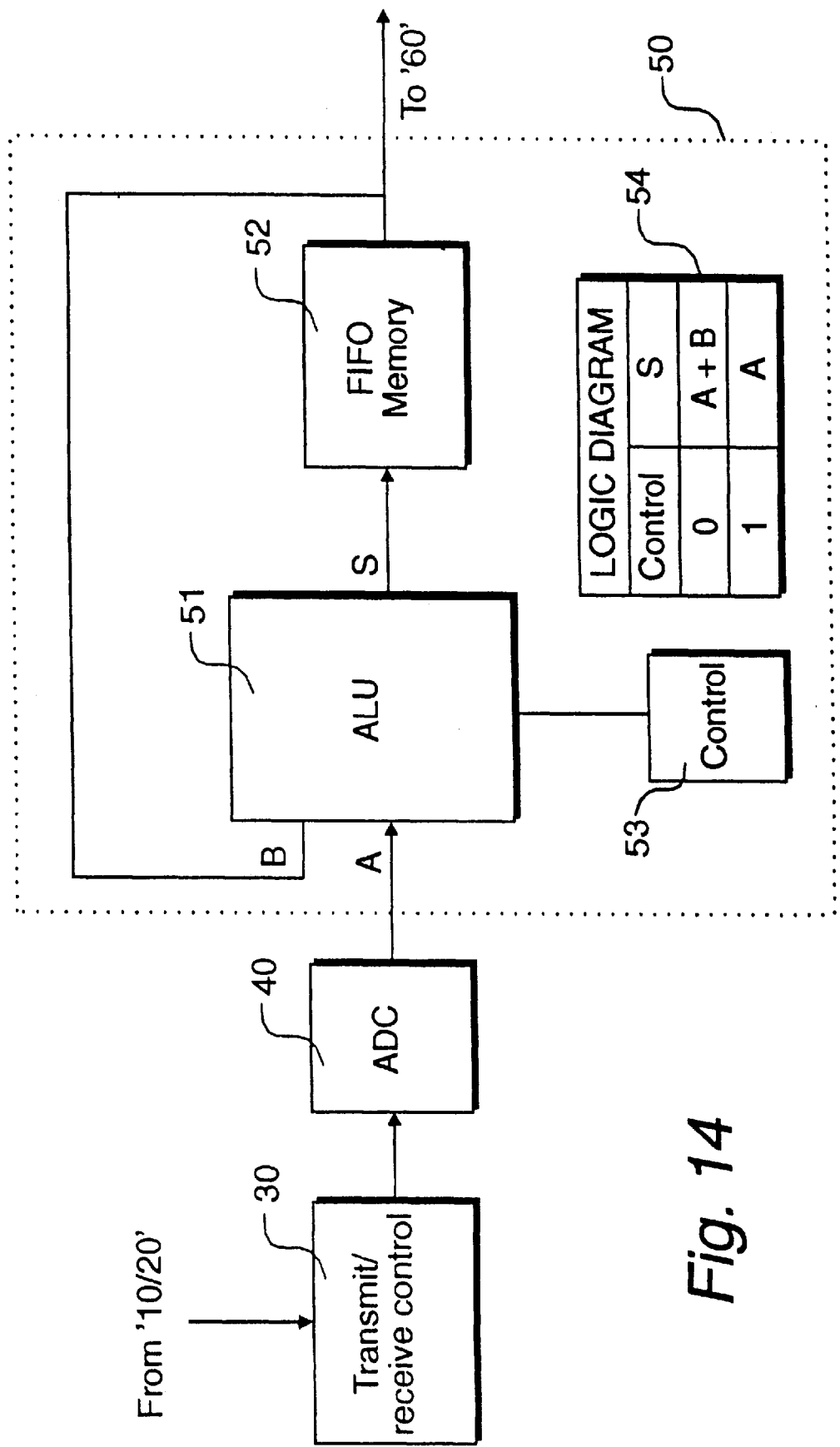
FIG. 14 is a more detailed block diagram of part of the system of FIG. 13.
Figure 15:
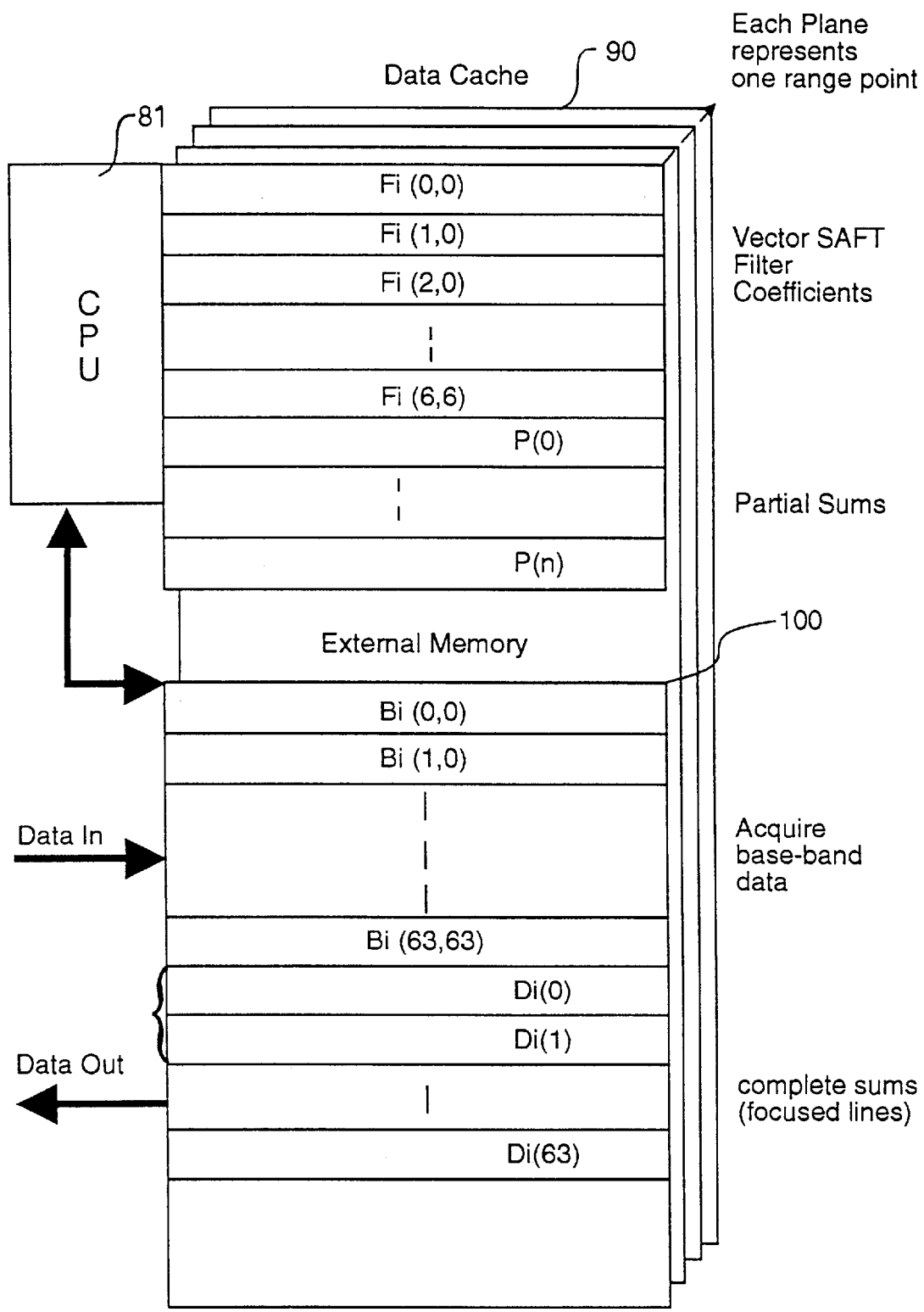
FIG. 15 is a diagrammatic representation of the architecture of the digital signal processor board used in the system of FIGS. 13 and 14.

FIGS. 13 to 15

The method and apparatus of the invention will now be described with reference to FIGS. 13 to 15.

The hardware implementation of the algorithm of the present invention has to process at a significant rate to produce real-time processing, and this system is illustrated in FIG. 13. It consists of the transducer array 10 and multiplexer 20 mounted on the catheter tip, an interface unit 30 to control the multiplexer 20 to address appropriate transducer elements in transmit and receive and to buffer signals, a transceiver unit 95 which performs the processing of the ultrasound data to produce an image, and a display 80. The transceiver unit consists of an ADC board 45, which consists of an analog-digital converter 40 and a data combination circuit 50, a computer based digital beam former 60, which consists of a master DSP board 61 and one or more slave boards 62, and a host computer 70.

The analog data in the form of a cross-product baseband quadrature pair $B_{j,k}$ produced by the interface unit 30 is passed to the ADC board 45, where it is converted to a digital signal by the ADC 40.

It is possible to make use of a fundamental symmetry of the acoustic data to reduce the processing requirements by nearly a half. It can be shown by application of the reciprocity theorem that Bij=Bji, and hence Fij=Fji. In one implementation, only Bij is acquired and Bji is synthesized using the identity above. In another implementation both are acquired and the mean taken, so: Bji=Bij=(B'ji+Bij')/2: B' are the acquired values, B are those passed on to the processor.

This averaging of symmetric values is implemented in the data combination circuit 50 of FIG. 13 which has the form shown in FIG. 14. Since the acquisition of Bij and Bji requires identical switch settings (both i and j closed) they can be obtained sequentially without stepping the shift register, the only difference being the use of the appropriate signal lines. First the data line Bij is acquired and stored in memory 52. Then the data set Bji is acquired and combined point by point with those from Bij.

The data combination circuit 50 comprises a programmable adder 51 (also known as an ALU (arithmetic logic unit)). The circuit 51 adds A+B to make S, so point by point it adds one incoming data set to the previous one stored in the FIFO memory. It is turned off by a signal from the control 53. The logic diagram is shown at 54.

Figure 12:
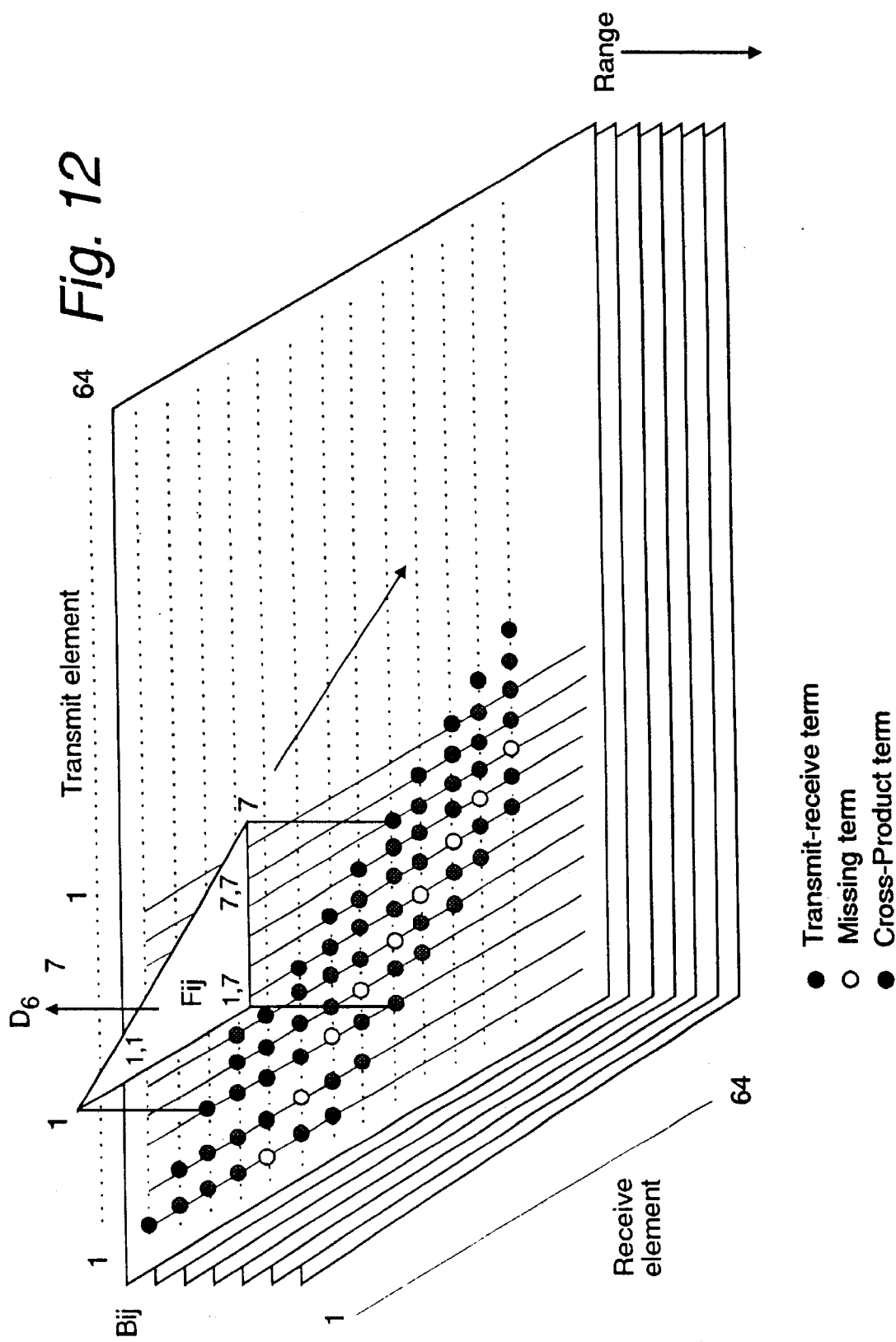
FIG. 12 is similar to FIG. 11 but illustrates the use of data symmetry to reduce the memory required.

The effect of this data symmetry is to eliminate all data points and filter coefficients on one side of the leading diagonal, so the arrangement of FIG. 11 becomes the arrangement of FIG. 12.

The data array $B_{ij}$ produced by the data combination circuit 50 is passed from the ADC board 45 to the master DSP boards 61 over an industry standard (RACEway™, Mercury Computer Inc.) high speed local data bus.

It should be noted that the filter matrix $F_{ij}$ will vary with range. In particular for close-in points the best beam profiles are obtained with a smaller aperture (m) than for larger ranges. This is analogous to the use of dynamic aperture in conventional beam-forming. It is achieved by modifying $F_{ij}$ to only use values from an aperture less than the matrix size, so many terms will be zero, with a central active sub-matrix.

It is also advantageous to calculate data along lines in between the elements, to give adequate sampling of the lateral resolution. This can be achieved using the same processing as equation (2) with a different set of filter coefficients $F_{ij}$ to that used to calculate the on-element response.

An efficient implementation of the process of performing the matrix multiplication of the equation (2) is shown in FIG. 15. FIG. 15 is the architecture of the particular processing card to perform matrix multiplication of the equation (3). Such a processing card 61 is the Mercury MDV6 (Mercury Computers Inc. Chelmsford, Mass.), which has up to four reduced-instruction-set (RISC) Intel i860 processors 81, arranged to operate in parallel as an array of vector processors. Each processor is closely coupled to a fast data cache 90 and also to a RAM external memory 100. Further boards may be added as slave DSP cards 62 to provide more processors.

Each incoming data line Bij contributes eventually to up to 2m+1 processed lines $D_{n'}$ and to make most efficient use of the high-speed cache memory 90 and processor 81, the 2m+1 products P are calculated in preparation for eventual summation as the data arrives prior to all the data being acquired for the output lines that the input data line contributes to and are stored in the cache memory 90. The coefficients Fij remain in the cache memory 90 at all times. The storage of partial products in this way allows efficient pipe-line processing of the data. Each range point has a different set of coefficients Fij, and these are stored as a 3-D matrix (2m+1,R) in the high speed cache memory 90, tier multiplication with the data set Bij, which is a vector of length R. This approach avoids the need for coefficients to be continually loaded in and out of high-speed cache memory.

The system also allows the use of multiple DSP processors 61 and 62 in FIG. 13 by sharing the range amongst the processors. In this implementation the processor depicted in FIG. 15, handles a fraction of the range, and a number of such processors cover the whole range.

These are arranged in a master/slave(s) configuration. This means the 3-D matrix of coefficients is different in each processor, and is a smaller matrix of (2m+1, 2m−1, R/Z), where Z is the number of processors. Apart from the coefficients loaded into its cache memory each processor performs the same operations, and so is suited to a parallel architecture, which is necessary to obtain the processing rate.

Once the partial products contributing to a particular data line are generated the data line is calculated from the appropriate sum and stored in external memory on the master board. The various ranges are concatenated to produce a full focused A-scan line. Once all the focused A-scan lines for a particular frame are assembled, they are then passed as a N*R array to the host computer which performs envelope detection, and scan conversion from R-format to a rectilinear X-Y format.

The coefficients Fij can be calculated from the geometric synthetic aperture/formula, and have the form of equation (3).

In another implementation the coefficients are calculated by an optimizing process which minimizes the square error between the beam profile produced and a desired beam profile.

As an alternative to the processors of FIG. 15 sharing the range they could instead share the angular displacement. In other words the total amount of processing to be carried out can be divided in a number of ways, including by range or by angular displacement, and then shared out among the plurality of processors.

Thus with this alternative of sharing by angular displacement the following variations to the description of FIG. 15 would apply.

Instead of handling a fraction of the range the processor shown in FIG. 15 would handle a fraction of the angular displacement, a number of such processors covering the whole circle.

Instead of the 3-D matrix of coefficients being different in each processor the 3-D matrix of coefficients would be the same in each processor in the case where it is the angular displacement which is being shared. In this latter case each processor would produce a segment of the complete focused A-scan lines, and thus perform the same operations and be suited to a parallel architecture which is necessary to obtain the processing rate required.

Once the partial products contributing to a particular data line are generated and the data line is calculated from the appropriate sum and stored in external memory (as with the embodiment previously described with reference to FIG. 15), in the case where the angular displacement is being shared the external memory is local to the current DSP board. Furthermore, each DSP board performs envelope detection and scan conversion from R-format to a rectilinear X-Y format for the A-lines corresponding to a sector of the image, typically one quadrant. The DSP boards process their respective sectors in parallel, and on completion, each passes the sub-array to the host computer 70. The host computer then assembles the sub-arrays into the full rectilinear X-Y image.

Such a host computer is a VME Sparc CPU10, (Force Computers Inc, San Jose, Calif.). The DSP board 61 transfers the data to the host computer over a VME bus 96, and the ADC board, DSP boards and host computer are all mounted in a standard VME card cage to form the transceiver 95.

With the arrangement described with reference to FIG. 15 where the processor handles a fraction of the range the circular image is in effect divided into annular rings whereas in the alternative described immediately above the circular image is divided into sections.

With the arrangements described above in connection with the drawings the signal lines can either be used for transmitting or receiving depending upon the particular transducer element pairing. In the preferred embodiment the multiplexer architecture selects less than all of the available cross-products. This not only results in a simpler construction but also avoids the need to switch between transmission and reception.

The present invention thus overcomes the problem of obtaining high image quality given that the overall physical arrangement is such that it is not possible to have one wire per transducer element. This is achieved by the use of cross-products which are acquired sequentially.

This acquisition can be achieved by means of a multiplexer although this has the disadvantage of requiring switching between transmission and reception.

As an alternative the number of cross-products may be reduced to enable a different multiplexer architecture which eliminates the need for switching between transmission and reception. With this modified multiplexer architecture it is still possible to obtain good quality images.

In a further embodiment shown in FIG. 16 those items which are equivalent to items in FIG. 13 have the same reference numerals. The receive signals from all the n receive lines can be acquired in parallel using the arrangement of FIG. 16, in which the ADC 40 and data combination circuit 50 are replicated n times so that there is one per signal line. This allows a set of n cross-products corresponding to the same transmit element and a number n receive elements to be obtained simultaneously rather than sequentially, by closing the appropriate n switches on the multiplexer. The echo wave-trains are stored in corresponding buffer memories on 50a to 50d and fed to the digital signal processing board 60 one cross-product at a time, and then processed in the same manner as if it had been acquired sequentially. In the embodiment of FIG. 16 n=4.

The advantage of this embodiment is that the full cross-product data set can be achieved with less transmit excitations. The time saved can be used to give a higher frame rate, or to permit repeat firings with the same settings to allow signal averaging and a higher signal-noise ratio than with sequential acquisition.

FIG. 18

The catheter is illustrated at 1 with the ultrasonic beam pattern 200 having a main lobe 201 and current focal point 202 with side-lobes 203a, 203b, 203c and 203d.

A reflector, such as a stent, is illustrated at 204.

Figure 18:
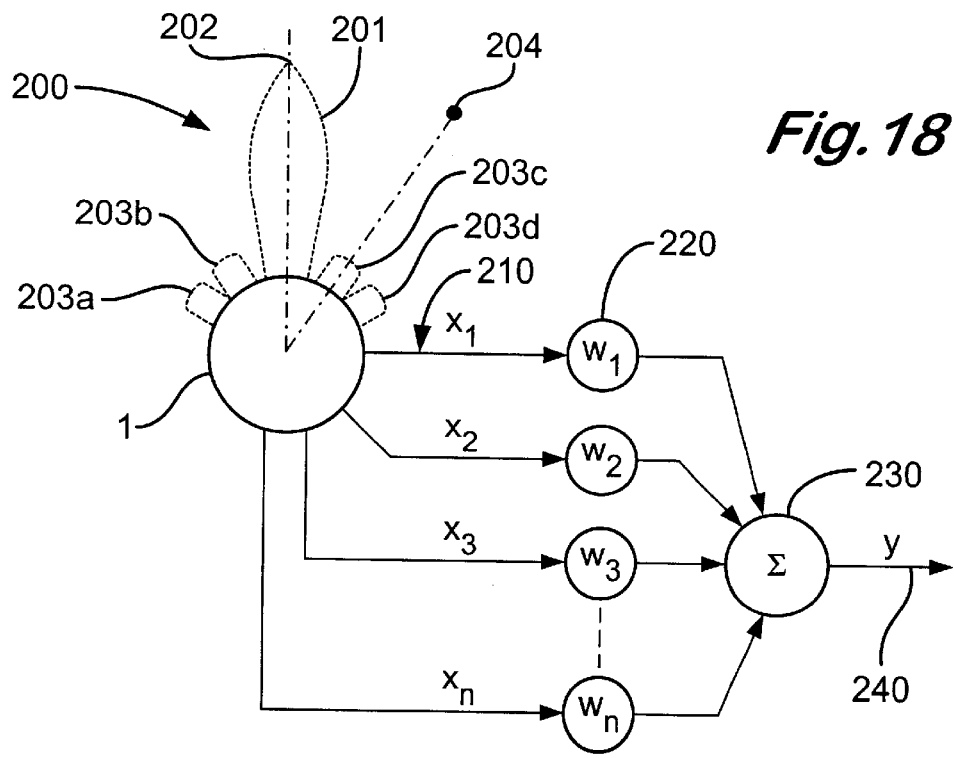
FIG. 18 illustrates diagrammatically an ultrasonic visualization system which employs a fixed set of filter coefficients as in the embodiments of the present invention illustrated in FIGS. 4 to 7.

The cross product signals are generally indicated at 210 and the filter coefficients at 220 in FIG. 18. The cross product data 210 as modified by the filter coefficients 220 is summed at 230 to produce an output y at 240.

As indicated earlier a disadvantage of the arrangement shown in FIG. 18, which employs fixed filter coefficients w, is that the relatively strong reflected echo signal from the stent 204 is not adequately suppressed even though 204 may be in line with a side-lobe 203c. This can lead to an artificial image of the reflector at the focal point.

FIG. 19

This figure illustrates a first improvement on the system of FIG. 18, the same reference numerals being used to denote equivalent elements to those in FIG. 18.

Figure 19:
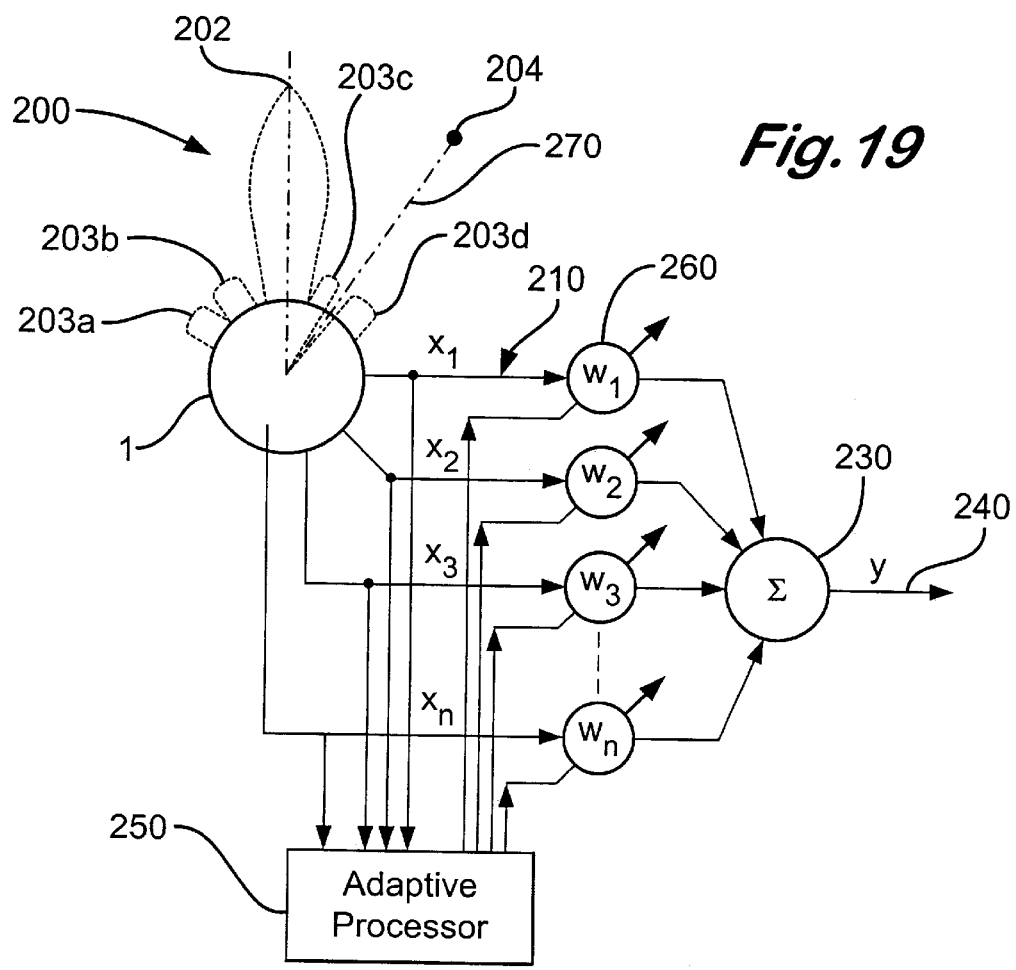
FIG. 19 illustrates a first improvement on the system of FIG. 18 which improvement involves the incorporation of an adaptive processor.

The difference between the arrangement of FIG. 19 when compared with FIG. 18 is that in FIG. 19 an adaptive processor 250 is provided by which the filter coefficients 220 in FIG. 18 can be varied to produce the variable filter coefficients 260 shown in FIG. 19.

Using the adaptive processor 250, a set of filter coefficients is calculated based upon the current cross product data. By exploiting the phase information in the data the adaptive processor 250 recognizes that the reflector 204 is at the side of the focal point and tries to cancel this signal. This results in a beam pattern with a null 270 in the direction of the reflector 204, as shown in FIG. 19, thus giving much greater attenuation than the system shown in FIG. 18. In other words the null between the two side-lobes 203c and 203d of FIG. 18 is steered in an anti-clockwise direction in order to align that null with the line running from the reflector 204 to the center of the catheter 1.

A brief mathematical analysis of adaptive filtering will now be given. The cross-product signals from the current aperture and range index are denoted by the n×1 vector x, where $x=[x_1\ x_2\ \ldots\ x_n]^T$ and T denotes the matrix transpose. The filter coefficients are given by the n×1 vector w $[w_1\ w_2\ \ldots\ w_n]^T$ and the scaler output from the array is given by $y=w^H x$ where H denotes the Hermitian (complex conjugate) transpose.

Referring back to the earlier description of FIG. 18, several methods of calculating w based upon x are possible. One method is to use the so-called Wiener solution referred to in the Haykin book mentioned earlier in connection with FIG. 18.

The Weiner solution minimizes the output power from the array subject to the constraint of holding the gain fixed at the focal point. This produces an optimum Signal to Noise plus Interference Ratio (SNIR), and the weight vector is given by:

$$w = \frac{R^{-1}c}{c^H R^{-1} c}$$

where R is the n×n covariance matrix whose (i,j) element is given by $R_{i,j}\ E<x_i x_j^H>$ where E< > denotes expectation. This matrix is estimated by averaging repeat firings of transmit-receive signals; a feature which is already built into the system to which the present invention applies. c is the constraint vector which holds the gain fixed at the focal point and is given by the phase across the aperture from a unit signal at the focal point. Diagonal loading may also be added to R to improve stabilization.

More sophisticated weight computation schemes may be used involving matching the current beam pattern w to a low side-lobe quiescent pattern $w_q$. However, the matching is not made exactly, thus allowing the beam pattern to steer the side-lobe null on the strong reflector whilst maintaining low side-lobes elsewhere. This weight vector is calculated by defining a cost-function consisting of the array output power plus the square of the error between the weight vector and the quiescent weight vector. The cost function is then minimized in a least squares sense. Reference is made to Hughes, D. T. and McWhirter, J. G., "Penalty function method for sidelobe control in least squares adaptive beamforming", SPIE Proceedings: 'Advanced Signal Processing Algorithms', San Diego, July, 1995, pp. 170–181.

It is difficult to implement the weight computation scheme referred to in real time whilst also keeping the imaging frame rate high. It may therefore be appropriate to make compromises.

One compromise is to use the adaptive processing close in to the catheter 1 in the initial range cells where the side-lobes are higher due to a smaller aperture. Fixed coefficients may then be used further out from the catheter 1. In other words a hybrid system may be employed which utilizes a combination of variable filter coefficients and fixed filter coefficients.

FIG. 20

This illustrates the case where the strong reflection is in the main lobe on the arrangement shown in FIG. 18, the same reference numerals being used to denote equivalent items to those shown in FIG. 19.

In this case, the adaptive processor 250 and variable filter coefficients 260 are arranged so that a null can be shifted into the main lobe to split it into two portions 205a and 205b so that a reflector 204 which is positioned much closer to the current focal point 202 than in FIGS. 18 and 19 is then aligned with the null formed between the two portions 205a and 205b.

This helps imaging tissue at the side of strong reflectors such as a stent 204 compared with the arrangement of FIG. 18 using fixed filter coefficients where both the tissue and the stent are in the main lobe 205 and it is therefore impossible to discriminate between them. In an arrangement as shown in FIG. 18 utilizing fixed values of the filter coefficients any variations in the performance of the catheter itself, due to manufacturing tolerances, can be critical in the sense that those manufacturing tolerances have to be relatively narrow in order to produce a catheter of satisfactory performance.

Figure 20:
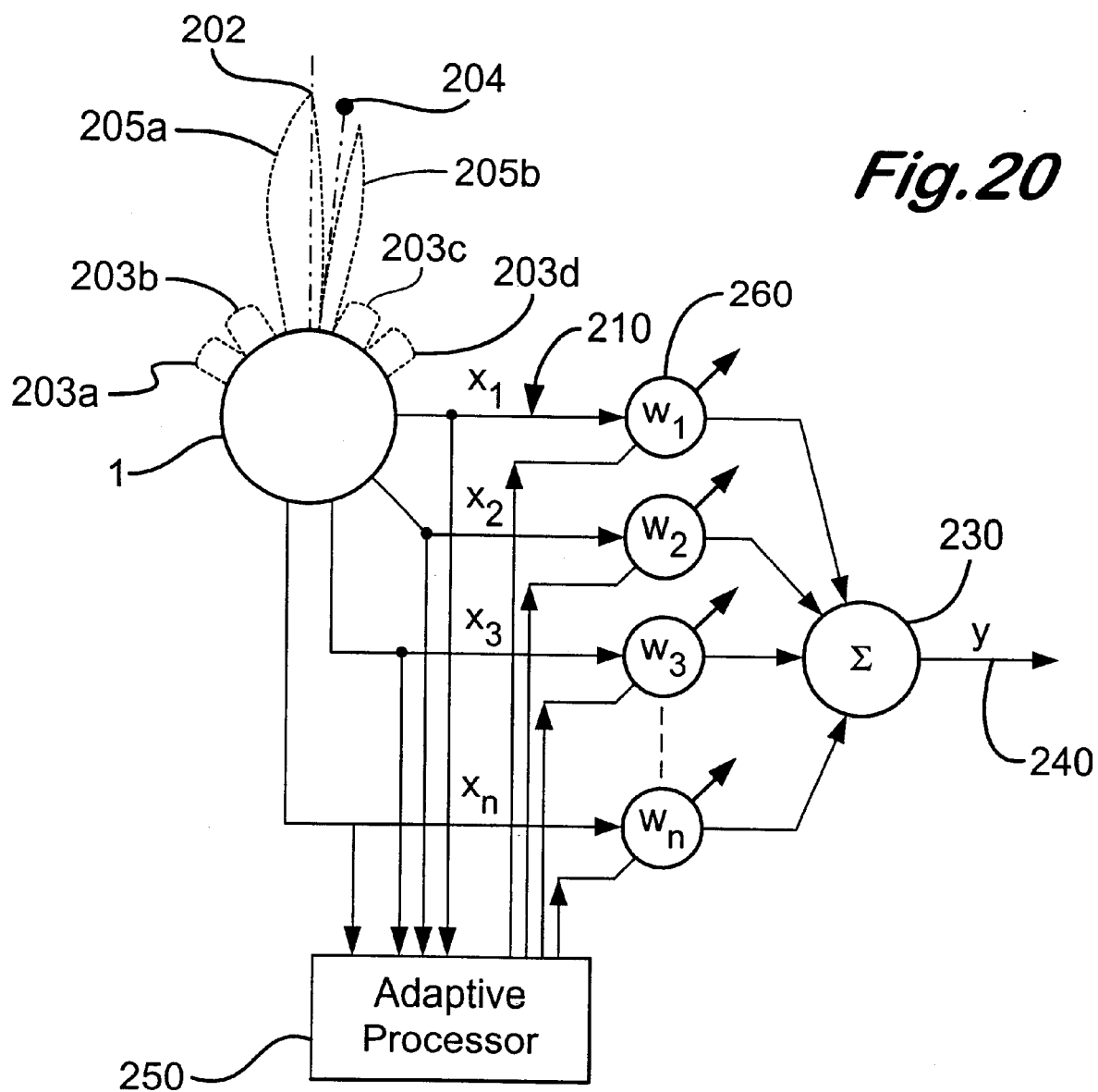
FIG. 20 is similar to FIG. 19 but illustrates the situation where the large reflector is in the main lobe.

With the improvements illustrated and described with reference to FIGS. 19 and 20 the manufacturing tolerances are not as critical because variations in the catheter sensitivity can be compensated for by the fact that the filter coefficients can be varied or tuned in the manner previously described.

Thus the use of adaptive processing will also have the further benefit of increasing the yield of usable catheters from the manufacturing process.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the appended claims.

What is claimed is:

1. An ultrasound system comprising:
a transducer array having a plurality of transducer elements for transmitting ultrasound pulses and for receiving echo pulses in response thereto,
means for energizing each transducer element, or batches of elements of the array, in turn, to generate an ultrasound pulse, and for receiving echo signals from at least two transducer elements resulting from transmission of an ultrasound pulse from another transducer element so that data used to create an image of the echo signals comes from said two transducer elements,
control means for controlling the order in which the transducers are energized and the order in which the transducers receive an echo pulse so as to carry out the energization and reception sequentially,
means for acquiring sequentially the data in analog form for a whole aperture, for acquiring sequentially the data for successive apertures and for processing the data for beam-formation for each aperture in correspondence with an analog echo pulse received by each transducer such that appropriate data sets once acquired are used for beam-formation of more than one aperture, said means for acquiring and processing including:
high speed memory means,
means for loading filter coefficients into the high speed memory means, and
means for varying the values of the filter coefficients.

2. An ultrasound system comprising:
a transducer array having a plurality of transducer elements for transmitting ultrasound pulses and for receiving echo pulses in response thereto,
means for energizing each transducer element, or batches of elements of the array, in turn, to generate an ultrasound pulse, and for receiving echo signals from at least two transducer elements resulting from transmission of an ultrasound pulse from another transducer element so that data used to create an image of the echo signals comes from said two transducer elements,
control means for controlling the order in which the transducers are energized and the order in which the transducers receive an echo pulse so as to carry out the energization and reception sequentially,
means for acquiring sequentially the data in analog form for a whole aperture and for acquiring sequentially the data for successive apertures and for processing the data for beam-formation for each aperture in correspondence with an analog echo pulse received by each transducer such that appropriate data sets once acquired are used for beam-formation of more than one aperture, said means for acquiring and processing including:
means for adaptively signal processing cross-product signals of data from said data sets.

3. An ultrasound system comprising:
a transducer array having a plurality of transducer elements for transmitting ultrasound pulses and for receiving echo pulses in response thereto,
means for energizing each transducer element, or batches of elements of the array, in turn, to generate an ultrasound pulse, and for receiving echo signals from at least two transducer elements resulting from transmission of an ultrasound pulse from another transducer element so that data used to create an image of the echo signals comes from said two transducer elements,
control means for controlling the order in which the transducers are energized and the order in which the transducers receive an echo pulse so as to carry out the energization and reception sequentially,
means for acquiring sequentially the data in analog form for a whole aperture and for acquiring sequentially the data for successive apertures and for processing the data for beam-formation for each aperture in correspondence with an analog echo pulse received by each transducer such that appropriate data sets once acquired are used for beam-formation of more than one aperture, said means for acquiring and processing including:
means for steering a null portion within the said beam-formation to a desired location.

* * * * *